United States Patent
Beck et al.

(10) Patent No.: US 8,672,065 B2
(45) Date of Patent: Mar. 18, 2014

(54) VEHICLE HAVING AN ARTICULATED SUSPENSION AND METHOD OF USING SAME

(75) Inventors: Michael S. Beck, Colleyville, TX (US); Jon T. Stinchcomb, Arlington, TX (US); Wendell H. Chun, Littleton, CO (US); Donald W. Nimblett, Midlothian, TX (US); James E. Tomlin, Grand Prairie, TX (US); Kevin L. Conrad, Mansfield, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1627 days.

(21) Appl. No.: 11/609,517

(22) Filed: Dec. 12, 2006

(65) Prior Publication Data
US 2007/0080001 A1 Apr. 12, 2007

Related U.S. Application Data

(63) Continuation of application No. 10/639,278, filed on Aug. 12, 2003, now abandoned.

(60) Provisional application No. 60/449,271, filed on Feb. 21, 2003.

(51) Int. Cl.
*B62D 61/10* (2006.01)

(52) U.S. Cl.
USPC .......... 180/24.07; 180/24; 180/65.1; 180/8.3; 180/6.48; 180/6.5; 180/347; 180/8.2

(58) Field of Classification Search
USPC ............ 180/24.07, 24, 6, 8.3, 6.48, 6.5, 65.5, 180/347, 8.2
See application file for complete search history.

(56) References Cited

U.S. PATENT DOCUMENTS

| | | | |
|---|---|---|---|
| 1,041,837 A | 10/1912 | Miks | 180/8.3 |
| 1,202,203 A | 10/1916 | Moench | 180/8.4 |
| 1,567,684 A | 12/1925 | Srakula | 180/8.4 |
| 1,783,995 A | 12/1925 | Berg | 180/24.07 |
| 2,748,879 A | 6/1956 | Bailey | 180/24.07 |
| 3,145,796 A | 8/1964 | Padula | 180/8.4 |

(Continued)

FOREIGN PATENT DOCUMENTS

| | | |
|---|---|---|
| CH | 295 771 | 3/1954 |
| EP | 872665 | 10/1998 |

(Continued)

OTHER PUBLICATIONS

U.S. Appl. No. 60/449,271, filed Feb. 21, 2003, Michael Beck.

(Continued)

*Primary Examiner* — Tashiana Adams
*Assistant Examiner* — Marlon Arce
(74) *Attorney, Agent, or Firm* — Withrow & Terranova, PLLC

(57) ABSTRACT

A vehicle includes a chassis and a plurality of wheel assemblies articulated with the chassis, each of the plurality of wheel assemblies comprising a rotatable wheel spaced away from the chassis. A vehicle includes a chassis and an articulated suspension system mounted to the chassis. A method includes comprising articulating at least one of a plurality of wheel assemblies with a chassis, each of the wheel assemblies including a rotatable wheel spaced apart from the chassis. A vehicle includes a chassis and articulatable means for rolling the chassis along a path.

12 Claims, 27 Drawing Sheets

(56) References Cited

U.S. PATENT DOCUMENTS

| | | | |
|---|---|---|---|
| 3,167,147 A | 1/1965 | Symons et al. | 180/235 |
| 3,397,896 A | 8/1968 | Willetts | 280/677 |
| 3,409,100 A | 11/1968 | Kronqvist | 180/6.54 |
| 3,513,927 A | 5/1970 | Kozowyk et al. | 180/41 |
| 3,566,825 A | 3/1971 | Ruf | 115/1 |
| 3,584,892 A | 6/1971 | Moore | 280/104 |
| 3,649,981 A | 3/1972 | Woodworth | 15/83 |
| 3,666,036 A | 5/1972 | Scerbo | |
| 3,730,287 A | 5/1973 | Fletcher et al. | |
| 3,806,141 A | 4/1974 | Janer | 280/6.156 |
| 3,842,926 A | 10/1974 | Williams et al. | 180/8.6 |
| 4,021,690 A | 5/1977 | Burton | 310/67 R |
| 4,049,070 A | 9/1977 | Soyland | 180/8.5 |
| 4,056,158 A * | 11/1977 | Ross | 180/6.48 |
| 4,162,713 A | 7/1979 | Heitman et al. | 180/242 |
| 4,176,726 A | 12/1979 | Schaeff | 180/15 |
| 4,291,779 A | 9/1981 | Mann et al. | 180/305 |
| 4,313,511 A | 2/1982 | Soo Hoo | 180/21 |
| 4,334,590 A | 6/1982 | Plumb | 180/247 |
| 4,342,278 A | 8/1982 | Horan | 114/345 |
| 4,491,207 A | 1/1985 | Boonchanta et al. | 188/299 |
| 4,555,126 A | 11/1985 | Ishimitsu et al. | |
| 4,600,069 A | 7/1986 | Oswald et al. | 180/24.02 |
| 4,702,843 A | 10/1987 | Oswald et al. | 280/5.507 |
| 4,709,265 A | 11/1987 | Silverman et al. | 348/158 |
| 4,720,120 A | 1/1988 | Shimatani et al. | 280/124.109 |
| 4,721,177 A | 1/1988 | Qizhen | 180/205 |
| 4,721,328 A | 1/1988 | Chauveau et al. | 280/124.129 |
| 4,771,848 A | 9/1988 | Namba et al. | 180/197 |
| 4,799,564 A | 1/1989 | Iijima et al. | 180/65.5 |
| 4,805,102 A | 2/1989 | Ise et al. | 701/37 |
| 4,836,342 A | 6/1989 | Wolfe | 188/319 |
| 4,898,257 A | 2/1990 | Brandstadter | 180/9.1 |
| 4,921,272 A | 5/1990 | Ivers | 280/707 |
| 4,957,307 A | 9/1990 | Gandiglio | 280/124.141 |
| 4,977,971 A * | 12/1990 | Crane et al. | 180/8.3 |
| 4,994,970 A | 2/1991 | Noji et al. | 701/25 |
| 5,005,658 A | 4/1991 | Bares et al. | 180/8.1 |
| 5,014,800 A | 5/1991 | Kawamoto et al. | 180/65.5 |
| 5,022,812 A | 6/1991 | Coughlan et al. | 414/729 |
| 5,033,573 A | 7/1991 | Hrovat | 180/197 |
| 5,037,125 A | 8/1991 | Zamitter et al. | 280/686 |
| 5,076,378 A | 12/1991 | Lagace | 180/9.1 |
| 5,087,229 A | 2/1992 | Hewko et al. | 475/149 |
| 5,137,101 A | 8/1992 | Schaeff | 180/8.1 |
| 5,180,180 A | 1/1993 | Yamashita et al. | 180/253 |
| 5,201,836 A | 4/1993 | DeWitt | 280/426 |
| 5,203,646 A | 4/1993 | Landsberger et al. | 405/191 |
| 5,248,008 A | 9/1993 | Clar | 180/9.32 |
| 5,276,623 A | 1/1994 | Wolfe | 364/424.05 |
| 5,277,281 A | 1/1994 | Carlson et al. | 188/267 |
| 5,316,100 A | 5/1994 | Juan | 180/167 |
| 5,350,033 A | 9/1994 | Kraft | 180/167 |
| 5,372,211 A * | 12/1994 | Wilcox et al. | 180/8.2 |
| 5,382,854 A | 1/1995 | Kawamoto et al. | 310/67 R |
| 5,405,181 A | 4/1995 | Watkins et al. | 298/17 B |
| 5,440,916 A | 8/1995 | Stone et al. | 73/23.31 |
| 5,443,354 A | 8/1995 | Stone et al. | 414/729 |
| 5,451,135 A | 9/1995 | Schempf et al. | 414/694 |
| 5,474,504 A | 12/1995 | Bay et al. | 475/274 |
| 5,515,934 A | 5/1996 | Davis | 180/8.2 |
| 5,517,414 A | 5/1996 | Hrovat | 701/91 |
| 5,519,611 A | 5/1996 | Tagawa et al. | |
| 5,525,115 A | 6/1996 | Vanzini | 475/146 |
| 5,528,978 A | 6/1996 | Forster | 92/140 |
| 5,549,837 A | 8/1996 | Ginder et al. | 252/62.52 |
| 5,581,136 A | 12/1996 | Li | 310/67 F |
| 5,652,704 A | 7/1997 | Catanzarite | 364/424.059 |
| 5,672,044 A | 9/1997 | Lemelson | 414/744.3 |
| 5,693,004 A | 12/1997 | Carlson et al. | 601/23 |
| 5,711,746 A | 1/1998 | Carlson | 482/112 |
| 5,733,218 A | 3/1998 | Sudau et al. | 475/347 |
| 5,762,407 A | 6/1998 | Stacey et al. | 303/155 |
| 5,762,466 A | 6/1998 | Fraser | 414/680 |
| 5,816,372 A | 10/1998 | Carlson et al. | 188/267.2 |
| 5,819,870 A | 10/1998 | Braun | 180/305 |
| 5,823,309 A | 10/1998 | Gopalswamy et al. | 192/21.5 |
| 5,842,547 A | 12/1998 | Carlson et al. | 188/267 |
| 5,845,753 A | 12/1998 | Bansbach | 192/21.5 |
| 5,896,965 A | 4/1999 | Gopalswamy et al. | 192/21.5 |
| 5,900,184 A | 5/1999 | Weiss et al. | 252/62.52 |
| 5,906,249 A | 5/1999 | Monkkonen | 180/292 |
| 5,947,238 A | 9/1999 | Jolly et al. | 188/267.1 |
| 5,993,358 A | 11/1999 | Gureghian et al. | 482/54 |
| 5,999,868 A | 12/1999 | Beno et al. | 701/37 |
| 6,010,139 A | 1/2000 | Heyring et al. | 280/124.104 |
| 6,092,011 A | 7/2000 | Kiramoto | 701/37 |
| 6,095,295 A | 8/2000 | Park et al. | 188/267.2 |
| 6,095,486 A | 8/2000 | Ivers et al. | 251/129.01 |
| 6,112,843 A | 9/2000 | Wilcox et al. | 180/345 |
| 6,113,343 A | 9/2000 | Goldenberg et al. | 414/729 |
| 6,123,027 A | 9/2000 | Suyama et al. | |
| 6,131,709 A | 10/2000 | Jolly et al. | 188/267.2 |
| 6,151,930 A | 11/2000 | Carlson | 68/12.06 |
| 6,157,879 A | 12/2000 | Kwack et al. | 701/37 |
| 6,161,639 A | 12/2000 | Jones | 180/8.4 |
| 6,199,654 B1 | 3/2001 | Kojo et al. | 180/443 |
| 6,208,920 B1 | 3/2001 | Izawa et al. | 701/36 |
| 6,267,196 B1 * | 7/2001 | Wilcox et al. | 180/347 |
| 6,276,475 B1 | 8/2001 | Nakanosono | 180/65.8 |
| 6,293,561 B1 | 9/2001 | Goetzen et al. | 280/5.52 |
| 6,293,562 B1 | 9/2001 | Kutscher | 280/6.159 |
| 6,318,522 B1 | 11/2001 | Johnston et al. | 188/267.2 |
| 6,360,148 B1 | 3/2002 | Halpin | 701/37 |
| 6,481,806 B1 | 11/2002 | Krueger et al. | 303/140 |
| 6,526,342 B1 | 2/2003 | Burdock et al. | 701/37 |
| 6,585,066 B1 | 7/2003 | Koneda et al. | 180/65.2 |
| 6,607,049 B2 | 8/2003 | Cigal | 180/305 |
| 6,622,074 B1 | 9/2003 | Coelingh et al. | 701/48 |
| 6,711,482 B2 | 3/2004 | Shiino et al. | 701/37 |
| 6,722,459 B1 | 4/2004 | Wendl et al. | 180/65.5 |
| 6,804,594 B1 | 10/2004 | Chen et al. | 701/42 |
| 6,816,753 B2 | 11/2004 | Sakamoto et al. | 700/245 |
| 6,816,764 B2 | 11/2004 | Coelingh et al. | 701/37 |
| 6,852,061 B2 | 2/2005 | Schoon | 475/348 |
| 6,859,702 B2 | 2/2005 | Kawashima et al. | 701/37 |
| 6,866,465 B2 | 3/2005 | Jester et al. | 414/556 |
| 6,942,049 B2 | 9/2005 | Shimizu | 180/65.6 |
| 7,150,340 B2 | 12/2006 | Beck et al. | 180/242 |
| 7,261,176 B2 | 8/2007 | Chun et al. | 180/209 |
| 7,464,775 B2 | 12/2008 | Clemens et al. | 180/8.3 |
| 2002/0084599 A1 | 7/2002 | Charaudeau et al. | 280/5.5 |
| 2003/0001734 A1 | 1/2003 | Schofield et al. | 340/442 |
| 2003/0033063 A1 | 2/2003 | Kawashima et al. | 701/37 |
| 2003/0125859 A1 | 7/2003 | Dix et al. | 701/50 |
| 2003/0150663 A1 | 8/2003 | Farbotnik et al. | 180/312 |
| 2003/0205424 A1 | 11/2003 | Felsing et al. | 180/242 |
| 2004/0046335 A1 | 3/2004 | Knox et al. | |
| 2004/0109750 A1 | 6/2004 | Klassen | 414/680 |
| 2004/0163863 A1 | 8/2004 | Beck et al. | 182/242 |
| 2004/0163869 A1 | 8/2004 | Chun et al. | 180/209 |
| 2004/0164505 A1 | 8/2004 | Clemens et al. | 180/8.3 |
| 2004/0167682 A1 | 8/2004 | Beck et al. | 701/3 |
| 2004/0231904 A1 | 11/2004 | Beck et al. | 180/268 |
| 2004/0232632 A1 | 11/2004 | Beck et al. | 280/5.5 |
| 2004/0239055 A1 | 12/2004 | Bender | |
| 2005/0145428 A1 | 7/2005 | Chun et al. | 180/209 |
| 2006/0082077 A1 | 4/2006 | Gouriet et al. | |
| 2006/0138732 A1 | 6/2006 | Buma et al. | 280/5.5 |
| 2007/0040341 A1 | 2/2007 | Kaloust et al. | 180/6.2 |
| 2007/0080001 A1 | 4/2007 | Beck et al. | 280/6.155 |
| 2007/0084664 A1 | 4/2007 | Beck et al. | 180/65.5 |
| 2009/0020351 A1 | 1/2009 | Chun et al. | 180/209 |
| 2009/0033045 A1 | 2/2009 | Clemens et al. | 180/8.3 |

FOREIGN PATENT DOCUMENTS

| | | |
|---|---|---|
| GB | 2382638 | 6/2003 |
| JP | 62251220 | 11/1987 |
| JP | 2262484 | 10/1990 |
| JP | 8169345 | 7/1996 |
| WO | WO 94/01181 | 1/1994 |
| WO | WO 01/53145 A1 | 7/2001 |
| WO | WO 2005/039956 A3 | 5/2005 |

(56) References Cited

FOREIGN PATENT DOCUMENTS

OTHER PUBLICATIONS

May 7, 2004 International Search Report (PCT/US/03/38918).
Jun. 27, 2005 PCT Search Report.
May 4, 2007 Non-Final Rejection for U.S. Appl. No. 10/784,341.
Oct. 24, 2007 Non-Final Rejection for U.S. Appl. No. 10/784,341.
Mar. 25, 2008 Non-Final Rejection for U.S. Appl. No. 10/784,341.
Mar. 31, 2008 Supplemental Non-Final Rejection for U.S. Appl. No. 10/784,341.
Dec. 2, 2008 Final Rejection for U.S. Appl. No. 10/784,341.
Feb. 26, 2009 Advisory Action for U.S. Appl. No. 10/784,341.
Apr. 6, 2009 Pre-Brief Appeal Conference Decision for U.S. Appl. No. 10/784,341.
May 30, 2006 Requirement for Election/Restriction for U.S. Appl. No. 10/784,739.
Aug. 15, 2006 Non-Final Rejection for U.S. Appl. No. 10/784,739.
Mar. 15, 2007 Final Rejection for U.S. Appl. No. 10/784,739.
May 25, 2007 Advisory Action for U.S. Appl. No. 10/784,739.
Jul. 9, 2007 Non-Final Rejection for U.S. Appl. No. 10/784,739.
Feb. 11, 2008 Final Rejection for U.S. Appl. No. 10/784,739.
Apr. 22, 2008 Advisory Action for U.S. Appl. No. 10/784,739.
May 19, 2008 Advisory Action for U.S. Appl. No. 10/784,739.
Dec. 8, 2008 Examiner's Answer to Appeal Brief for U.S. Appl. No. 10/784,739.
May 6, 2009 Appeal Docketing Notice for U.S. Appl. No. 10/784,739.
Dec. 30, 2008 Requirement for Election/Restricion for U.S. Appl. No. 11/530,129.
Mar. 31, 2009 Non-Final Rejection for U.S. Appl. No. 11/530,129.
Sep. 14, 2007 Non-Final Rejection for U.S. Appl. No. 11/609,517.
Apr. 2, 2008 Final Rejection for U.S. Appl. No. 11/609,517.
Sep. 15, 2008 Notice of Defective Appeal Brief for U.S. Appl. No. 11/609,517.
Jan. 12, 2009 Examiner's Answer to Appeal Brief for U.S. Appl. No. 11/609,517.
Jun. 12, 2009 Order Returning Undocketed Appeal to examiner from BPAI for U.S. Appl. No. 11/609,517.
Feb. 6, 2009 Non-Final Rejection for U.S. Appl. No. 11/559,988.
Feb. 26, 2009 Non Final Rejection for U.S. Appl. No. 12/180,905.
Apr. 28, 2009 Non-Final Rejection for U.S. Appl. No. 12/207,210.
Non-final Office Action for U.S. Appl. No. 11/530,129 mailed Aug. 7, 2013, 6 pages.

\* cited by examiner

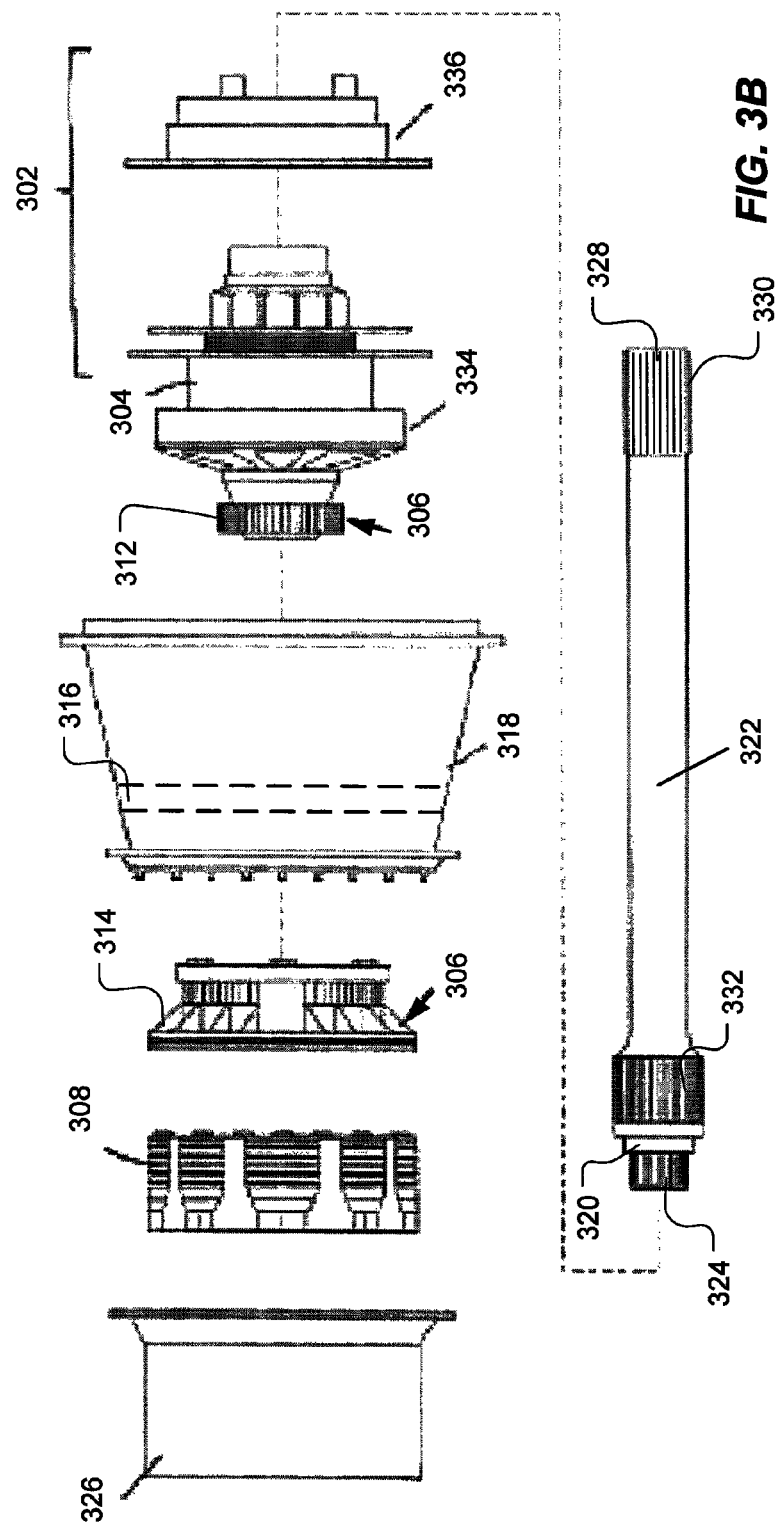

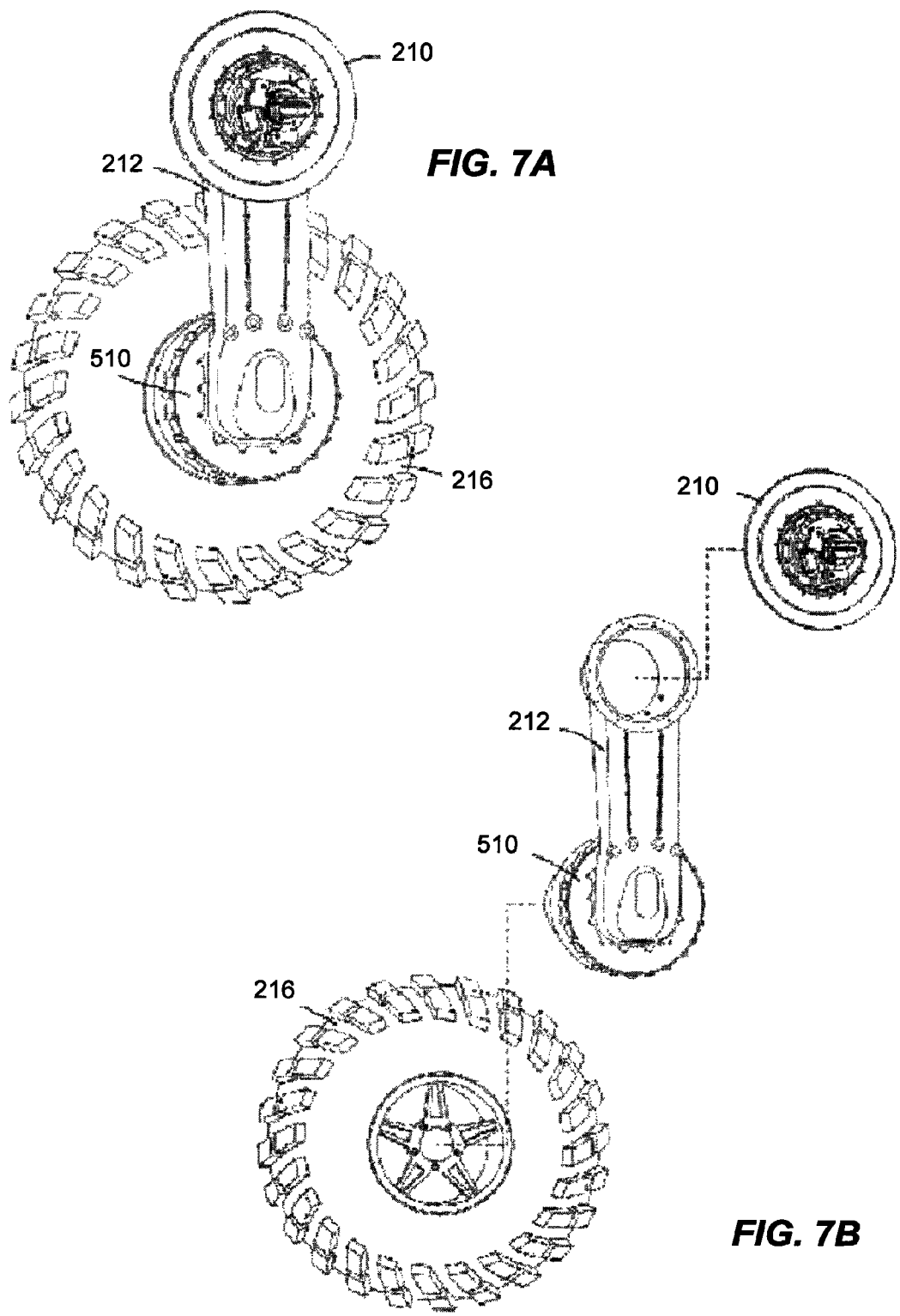

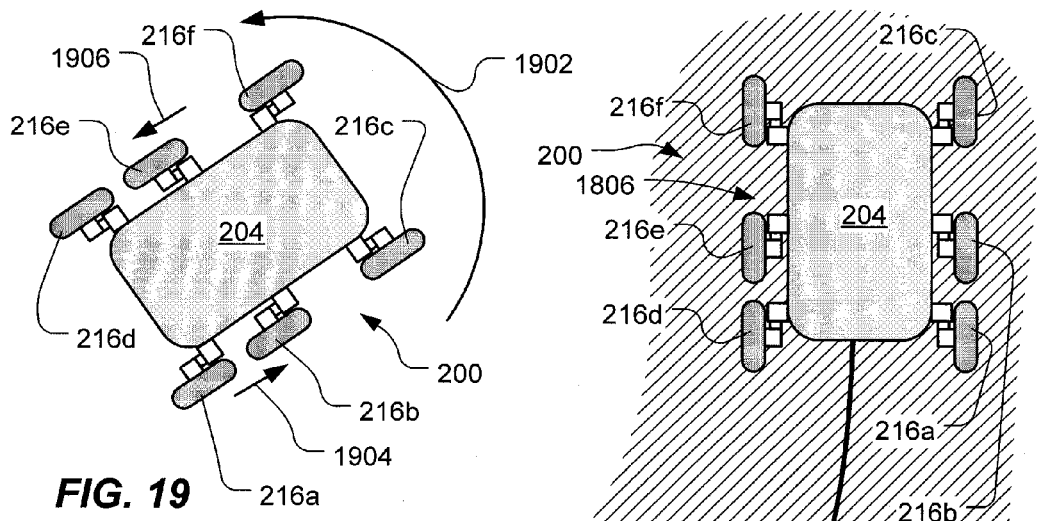
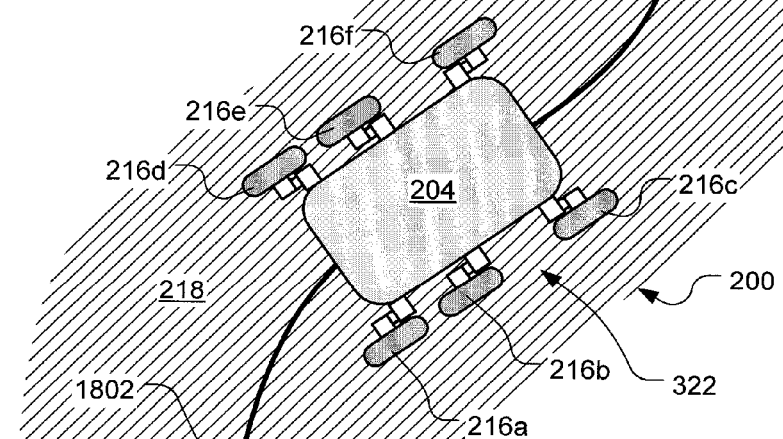
FIG. 19
FIG. 18

VEHICLE HAVING AN ARTICULATED SUSPENSION AND METHOD OF USING SAME

This is a continuation of U.S. application Ser. No. 10/639,278 ("the '278 application"), entitled "Vehicle Having An Articulated Suspension And Method Of Using Same", filed Aug. 12, 2003 now abandoned, in the name of the inventors Michael S. Beck, et al., which was published Feb. 3, 2005, as Publication No. US 2005/0023052. The '278 application and the present application are related to and claim priority from provisional application Ser. No. 60/449,271 ("the '271 application"), filed Feb. 21, 2003. The earlier effective filing dates of the '271 application and the '278 application are hereby claimed for all common subject matter. The '278 application and the '271 application are also hereby incorporated by reference in their entirety for all purposes as if expressly set forth verbatim herein.

The earlier effective filing date is claimed of co-pending U.S. Provisional Application Ser. No. 60/449,271, entitled "Unmanned Ground Vehicle," filed Feb. 21, 2003, in the name of Michael S. Beck, et al., for all common subject matter.

BACKGROUND OF THE INVENTION

1. Field of the Invention

This invention relates to vehicle and, in particular, to a vehicle having an articulated suspension and a method of using the vehicle.

2. Description of the Related Art

Technological advances continually permit engineers and scientists to expand the arenas into which automated or robotic techniques can be applied. Speed, efficiency, cost, and safety frequently drive the adoption and/or application of these techniques. However, several factors retard the application of robotic technologies to vehicles, and especially to land vehicles. For instance, vehicles are designed to travel. This functionality raises a host of challenging issues such as obstacle avoidance, both in recognizing and overcoming the obstacles. Even relatively mundane types of vehicles face these challenges, but many subclasses of vehicles face challenges over and above obstacle avoidance. Consider, for instance, robotic vehicles for military application. Such robotic vehicles ideally should be easy in deployment, versatile in deployment, relatively self-sufficient for long periods of time, and be able to survive in hostile conditions.

As mentioned above, land vehicles often encounter obstacles in their path. For example, a car, traveling down a road, may encounter debris extending across the road. The car may have little trouble traveling across the debris if it is small, such as a small tree limb. However, if the debris is large, such as a tree trunk, the car may have difficulty traveling across the debris.

As shown in FIG. 1, a vehicle having a wheel 102 of radius R rolling along a surface 104 may generally traverse an obstacle 106 having a height X no greater than about the radius R of the wheel 102. Obstacles having heights X greater than the radius R of the wheel 102 will typically block progress of the vehicle beyond the obstacle. While this limitation may present few problems on paved roads, many vehicles are used in off-road environments, both here on Earth and on other planets, where the terrain may present many larger obstacles.

One approach to overcome this problem has been to use a "rocker-bogie" suspension in vehicles that may encounter large obstacles. Generally, rocker-bogie suspensions are passive mechanisms that include two rocker arms connected to the vehicle chassis. Each rocker has a rear wheel connected to one end and a secondary rocker, called a bogie, connected to the other. At each end of the bogie is a drive wheel and the bogie is connected to the rocker with a free pivoting joint. The rockers are connected to the vehicle chassis with a differential so that the pitch angle of the chassis is the average of the pitch angles of the rockers. Typically, vehicles utilizing rocker-bogie suspensions may traverse obstacles having heights of less than about two times the wheel radius (i.e., the wheel radius R of FIG. 1). Thus, obstacles may be encountered that such vehicles still cannot traverse.

Land vehicles and, in particular, military land vehicles, also face other challenges, such as turning in tight quarters, quickly braking to a stop, evading identification by hostile forces, and avoiding rollover while traversing rugged and/or steep terrain.

The present invention is directed to overcoming, or at least reducing, the effects of one or more of the problems set forth above.

SUMMARY OF THE INVENTION

In one aspect of the present invention, a vehicle is provided. The vehicle includes a chassis and a plurality of wheel assemblies articulated with the chassis, each of the plurality of wheel assemblies comprising a rotatable wheel spaced away from the chassis.

In another aspect of the present invention, a vehicle is provided. The vehicle includes a chassis and an articulated suspension system mounted to the chassis.

In yet another aspect of the present invention, a method of operating a vehicle is provided. The method includes comprising articulating at least one of a plurality of wheel assemblies with a chassis, each of the wheel assemblies including a rotatable wheel spaced apart from the chassis.

In another aspect of the present invention, a vehicle is provided. The vehicle includes a chassis and articulatable means for rolling the chassis along a path.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIGS. 3A-3B are partial cross-sectional and exploded views, respectively, of an illustrative embodiment of a shoulder joint of the vehicle of FIGS. 2A-2C;

FIGS. 7A-7B are pictorial and exploded pictorial views, respectively, of an illustrative embodiment of a wheel assembly according to the present invention;

FIG. 18 is a stylized, top, plan view of the vehicle of FIGS. 2A-2C illustrating the movement thereof along a non-linear path;

FIG. 19 is a stylized, top, plan view of the vehicle of FIGS. 2A-2C illustrating skid steering;

Figure 1:
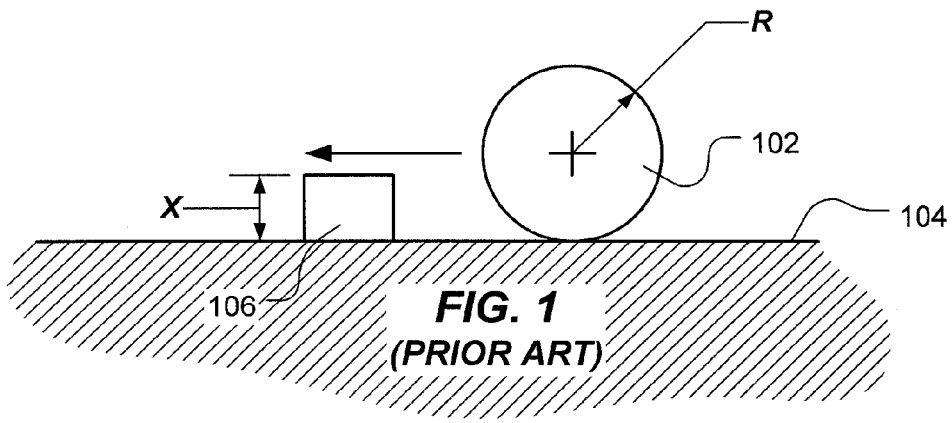
FIG. 1 is a diagram illustrating obstacle negotiation of conventional vehicles.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 2A:
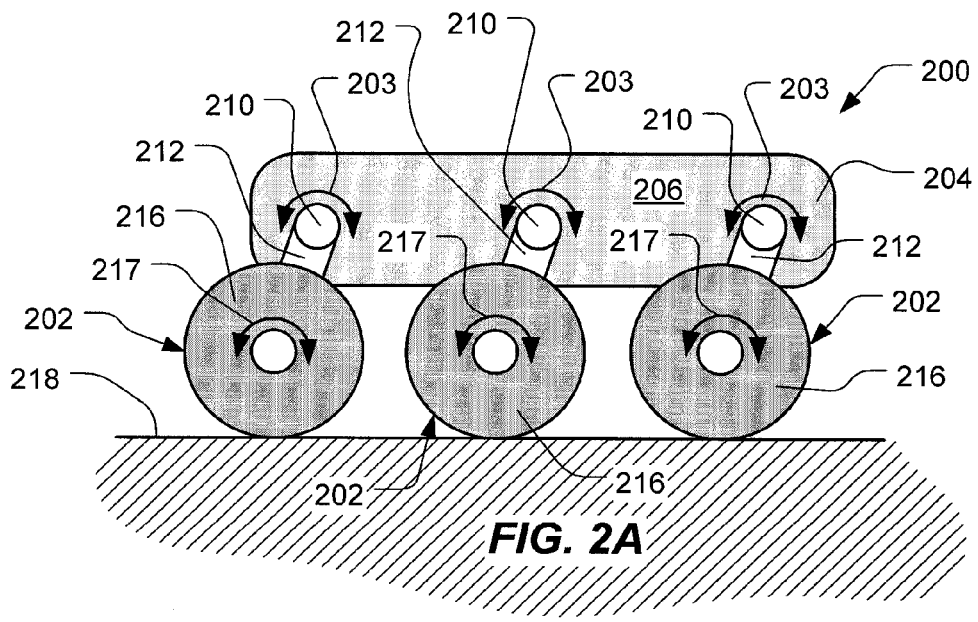
FIGS. 2A-2C are stylized, side elevational, end elevational, and top plan views, respectively, of an illustrative embodiment of a vehicle according to the present invention.
Figure 2B:
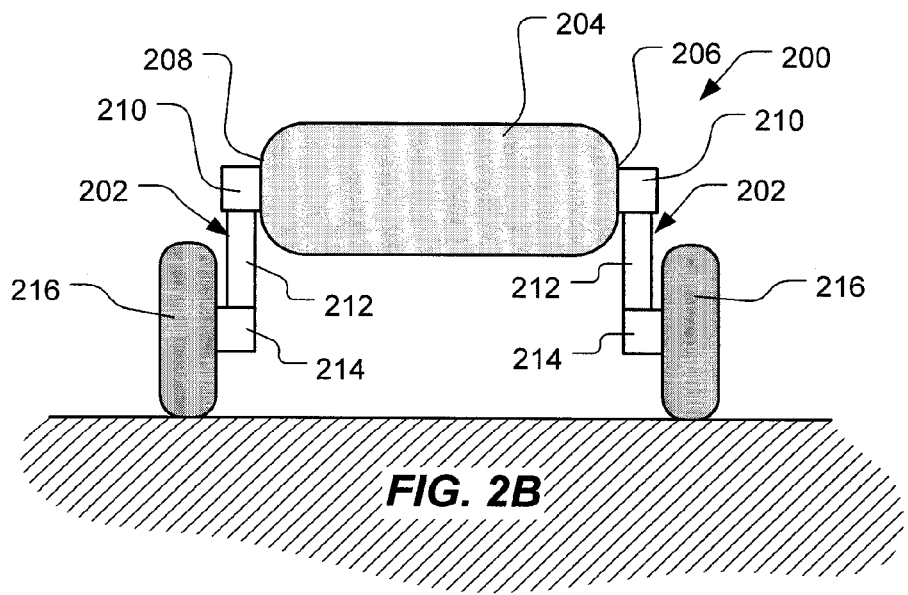
Figure 2C:
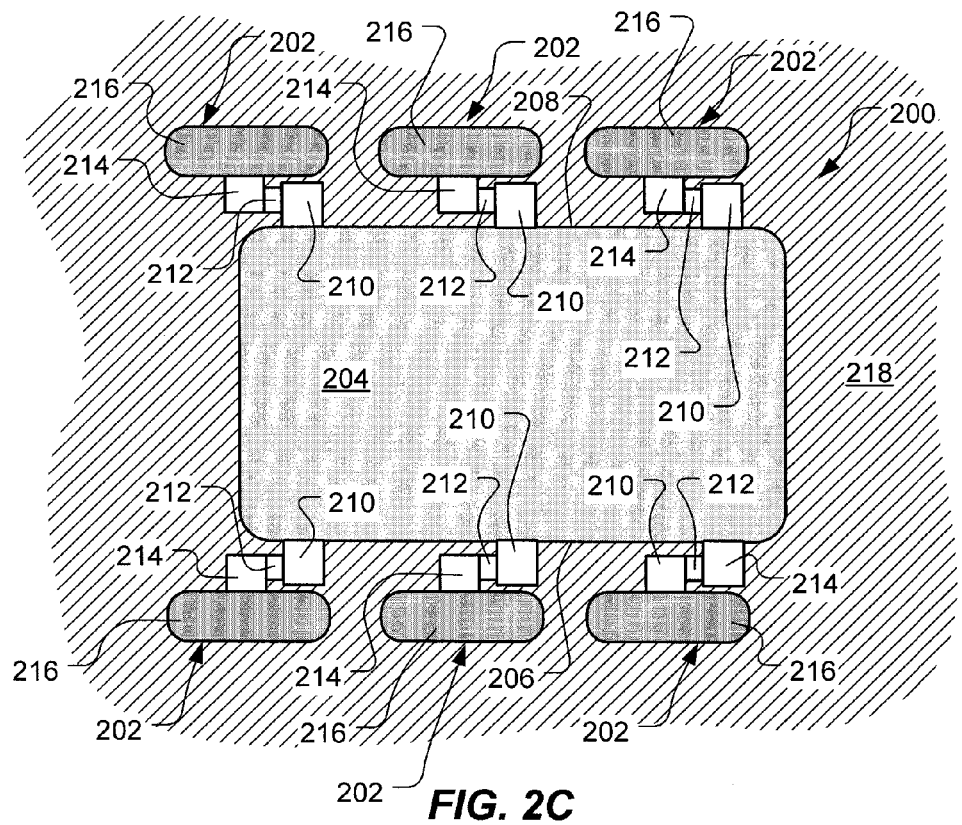

FIG. 2A-FIG. 2C are a side elevational view, an end elevational view, and a top plan view, respectively, of an illustrative embodiment of a vehicle 200 according to the present invention. The vehicle 200 comprises a plurality of wheel assemblies 202 articulated with a chassis 204. In the illustrated embodiment, each of the plurality of wheel assemblies 202 is rotationally articulated with the chassis 204, as indicated by arrows 203. The wheel assemblies 202, when attached to the chassis 204, implement an articulated suspension system for the vehicle 200. Thus, by way of example and illustration, the articulated suspension system is but one articulatable means for rolling the chassis 204 along a path in accordance with the present invention. Each of the wheel assemblies 202 comprises a link structure or suspension arm 212, a wheel 216 rotatable with respect to the link structure 212, and a hub drive 214 for rotating the wheel 216. The vehicle 200, as illustrated in FIG. 2A-FIG. 2C, includes six wheel assemblies 202. The present invention, however, is not limited to a vehicle (e.g., the vehicle 200) having six wheel assemblies 202. Rather, the scope of the present invention encompasses such a vehicle having any chosen number of wheel assemblies 202, for example, four wheel assemblies 202 or eight wheel assemblies 202.

The vehicle 200, for example, may comprise the same number of wheel assemblies 202 articulated with a first side 206 and articulated with a second side 208 of the chassis 204, as shown in FIG. 2A-FIG. 2C. However, the vehicle 200 may alternatively include a different number of wheel assemblies 202 articulated with the first side 206 than are articulated with the second side 208. For example, the scope of the present invention encompasses a vehicle (e.g., the vehicle 200) having three wheel assemblies 202 articulated with the first side 206 and four wheel assemblies articulated with the second side 208.

The chassis 204 is illustrated in FIG. 2A-FIG. 2C and others in a stylized fashion and, thus, corresponds to any chosen type of chassis 204 for the vehicle 200. For example, the chassis 204 may have a configuration capable of carrying cargo or personnel, capable of deploying armaments, adapted for reconnaissance tasks, or capable of assisting dismounted personnel to traverse an obstacle to their progress.

Still referring to FIG. 2A-FIG. 2C, each of the wheel assemblies 202 is independently articulated with the chassis 204 by one of a plurality of driven shoulder joints 210. When a particular shoulder joint 210 is articulated, the wheel assembly 202 coupled therewith is rotated with respect to the chassis 204. Each of the shoulder joints 210 may be driven by independent drives (i.e., not mechanically linked to each other) or two or more of the shoulder joints 210 may be driven by components of a power transmission system (e.g., a geartrain with clutched power take-offs) capable of operating each of the shoulder joints 210 independently. Each of the shoulder joints 210 may be driven by the same type of drive or they may be driven by different types of drives.

Each of the wheel assemblies 202 may be independently moved, via its shoulder joint 210, to any desired rotational position with respect to the chassis 204 at a chosen speed. For example, each of the wheel assemblies 202 may be moved from a starting rotational position (e.g., a "zero" or "home" rotational position) to a rotational position of 45 degrees clockwise, to a rotational position of 380 degrees counter-clockwise, or to any other desired rotational position.

Figure 3A:
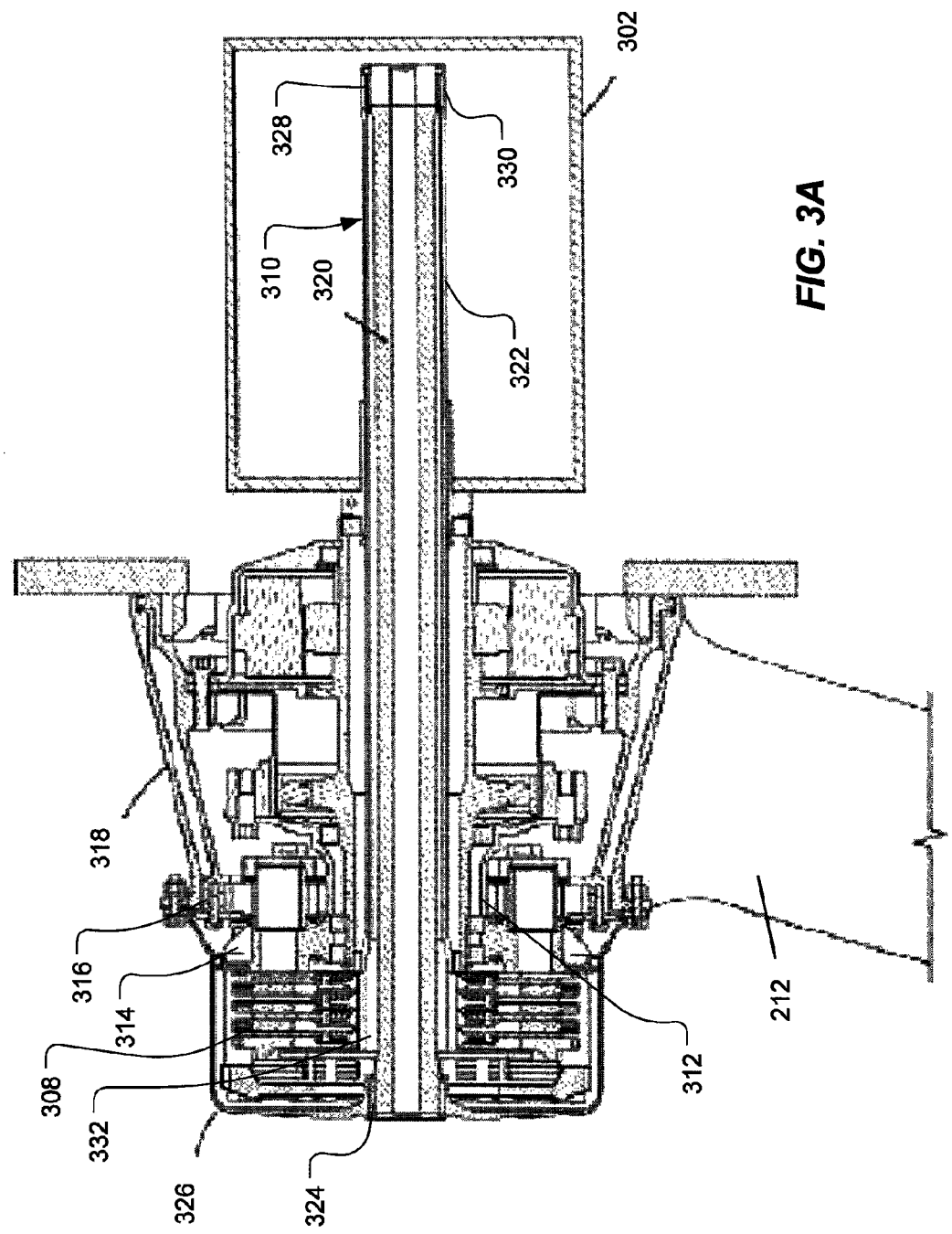

FIG. 3A-FIG. 3B depict one particular illustrative embodiment of the shoulder joint 210. The shoulder joint 210 comprises, in the embodiment illustrated in FIG. 3A-FIG. 3B, a drive 302, a harmonic drive 304, a planetary gear set 306, a slip clutch 308, and a torsion bar assembly 310 connected in series between the chassis 204 and a link structure 212 (each shown in FIG. 2A-FIG. 2C). The planetary gear set 306 includes a sun gear 312 that engages a planetary gear 314 that, in turn, engages a ring gear 316 on the interior of a housing 318. The torsion bar assembly 310 includes an inner torsion bar 320 and an outer torsion bar 322. The inner torsion bar 320 includes, on one end thereof, a plurality of splines 324 that engage an end bell 326. The inner torsion bar 320 is nested within the outer torsion bar 322 and includes, on the other end, a plurality of splines 328 that engage an interior of a cup 330 of the outer torsion bar 322. The outer torsion bar 322 also includes a plurality of splines 332 that engages the slip clutch 308.

The shoulder joint 210 also includes a housing 318 to which the suspension arm 212 is attached. Note that, in the illustrated embodiment, the suspension arm 212 is fabricated integral to the housing 318, i.e., the housing 318 and the suspension arm 212 structurally form a single part. A plurality of bearings (not shown) are disposed within the housing 318. The bearings interact with the planetary gear set 306 to rotate the housing 318 and, hence, the suspension arm 212. The shoulder joint 210 is capped in the illustrated embodiment by the end bell 326 to transmit torque between the torsion bar assembly 310 and the suspension arm 212, as well as to help protect the shoulder joint 210 from damage and debris.

The drive 302 is, in the illustrated embodiment, an electric motor including a rotor 334 and a stator 336. The drive 302 can be co-aligned along the same axis of the shoulder joint 210, as depicted in the illustrated embodiment. Alternatively, the drive 302 can be offset (not shown) and connected to the axis of actuation through a transmission, e.g., a chain-driven transmission. The drive 302 does not have to be electric, and can be a hydraulic, pneumatic, or a hybrid motor system. The drive 302 may comprise any type of drive known to the art, for example, a direct drive motor, a servo motor, a motor-driven gear set, an engine-driven gear set, a rotary actuator, or the like. The drives 302 may be mechanically independent drives (i.e., not mechanically linked to each other) or may be components of a power transmission system (e.g., a gear train with clutched power take-offs) capable of operating each of the drives 302 independently.

The harmonic drive 304 and the planetary gear set 306 implement a mechanical transmission. Some embodiments may include alternative mechanical transmissions and may also include a spur gear train, a traction drive, etc., in implementing a mechanical transmission. Mechanical transmissions have three primary applications in machine design: speed reduction, transferring power from one location to another, and converting motion from prismatic to rotary or vice versa. The shoulder joint 210 employs the mechanical transmission for speed reduction, which proportionally increases torque to rotate the wheel assembly 202. For most moving parts, bearings are used to reduce friction and typically are designed in pairs to protect against both radial and thrust loading on the actuator. Since the bearings transfer loads, the structure or housing of the shoulder actuator should be designed adequately to preclude structural failures and deflections. The harmonic drive 304 provides a first speed reduction and the planetary gear set 306 provides a second speed reduction.

The drive 302 and the transmission (i.e., the harmonic drive 304 and planetary gear set 306) may be considered the heart of the actuator for the shoulder joint 210. The remaining components facilitate the operation of the drive 302 and the transmission and may be omitted in various alternative embodiments (not shown). A clutch assembly (i.e., the slip clutch 308) may be integrated such that the linked wheel assembly 202 may be disengaged (not powered or controlled) where positioning is passive based only on gravity effects. The slip clutch 308 also limits the torque through the drive system and is capable of dissipating energy to prevent damage. Similarly, a torsion assembly (i.e., the torsion bar assembly 310) may be used to control the twist properties of the shoulder joint 210 by actively engaging different effective torsion bar lengths. Thus, some embodiments may include the slip clutch 308 and/or the torsion bar assembly 310, whereas others may omit them.

Figure 4A:
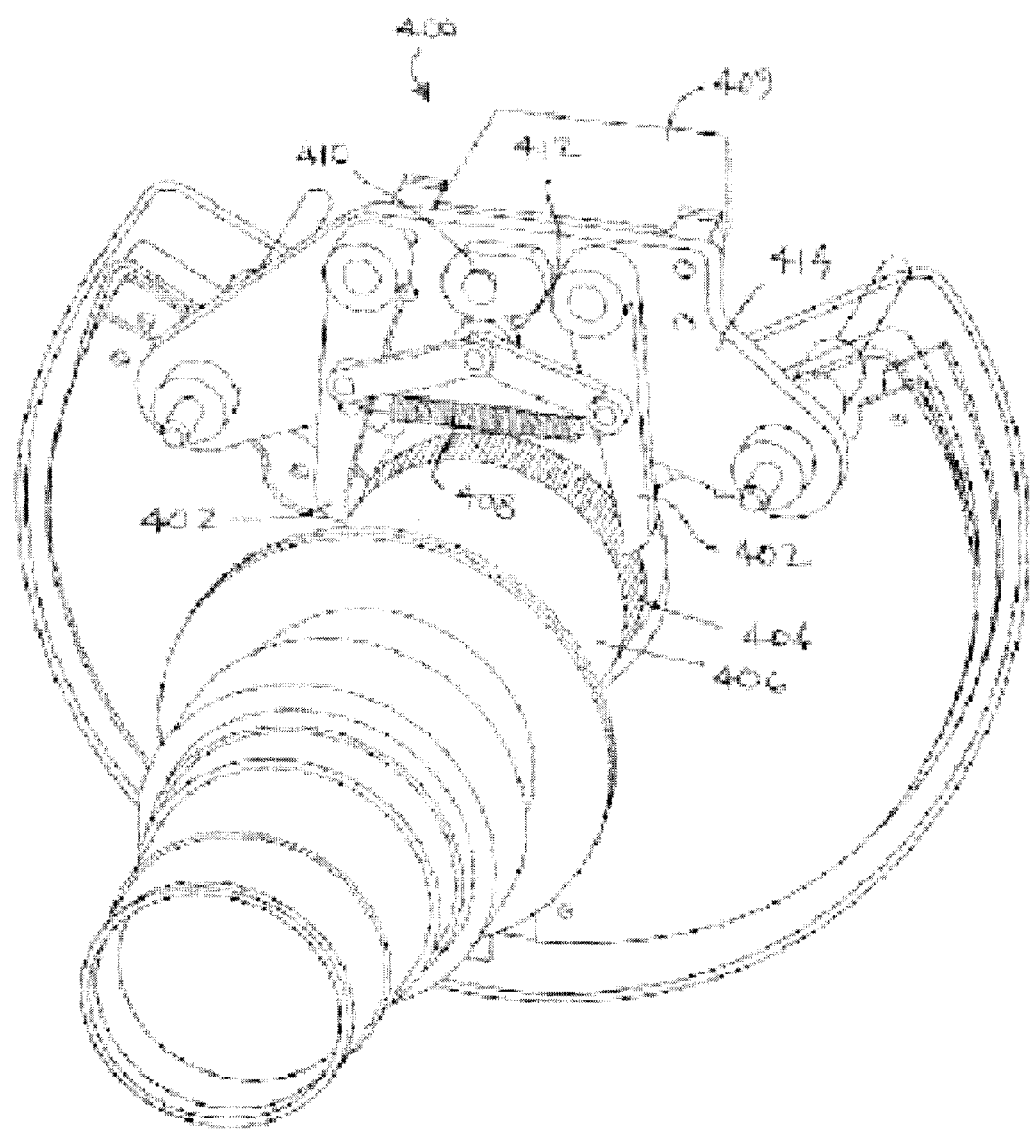
FIGS. 4A-4C are pictorial views of an illustrative embodiment of a locking mechanism according to the present invention for the shoulder joint of FIGS. 3A-3B.
Figure 4B:
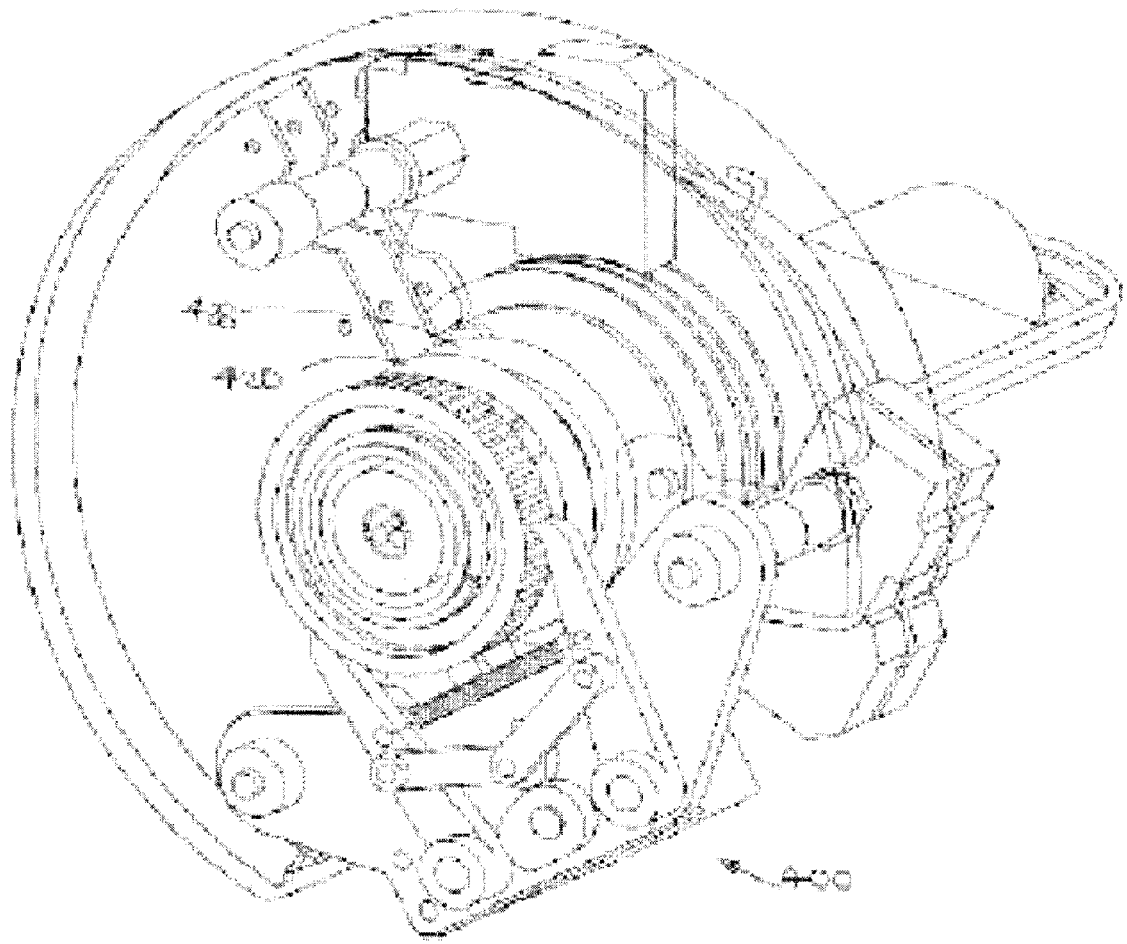

As is shown in FIG. 4A-FIG. 4B, in one embodiment, a small spring-applied, electrically released locking mechanism 400 prevents rotation of the drive 302 so that power is not required when the vehicle 200 is static. The locking mechanism 400 is a fail-safe/power-off device, which is spring actuated or actuated by using another motor to incrementally increase the friction between two surfaces based on pressure (i.e., a clamping effect). Thus, the locking mechanism 400 is able to lock the joint at a prescribed position.

More particularly, the locking mechanism 400 of the illustrated embodiment includes a pair of pawls 402 that interact with a toothed lock ring 404 on the motor shaft 406 of the drive 302. A spring 408, or some other biasing means, biases the pawls 402 to close on the lock ring 404 when the cam 410 is positioned by the servo-motor 409 to allow for movement of the driver 412 and linkage. To unlock the locking mechanism 400, the servo-motor 409 actuates the cam 410 to operate against the driver 412 and open the pawls 402 away from the lock ring 404. Note that the pawls 402, the servo-motor 409, cam 410, and driver 412 are all mounted to a mounting plate 414 that is affixed to the chassis 204 (shown in FIG. 2). When the locking mechanism 400 is engaged, no power is required. However, in some alternative embodiments, a spring-applied brake may be used to facilitate locking the actuator shaft 406. In these embodiments, the locking mechanism 400 will still lock the shoulder joint 210 on power failure, but will consume power when unlocked, as long as power is available.

FIG. 4B also illustrates a plurality of encoders. To know the absolute position of the shoulder joint 210, a position sensor such as a resolver, encoder, or potentiometer is used to measure for this information. The illustrated embodiment employs an arm position encoder 420 and a torsion bar twist encoder 422 to acquire data regarding the position of the arm 304 and the twist on the torsion bar assembly 310, respectively. From this data, a control system (not shown) can determine the arm speed, arm reaction torque, and estimated suspension load for the shoulder joint 210. Note that some embodiments may integrate a tachometer and calculate the same position data using simple calculus.

Vibrations or other undesirable motions induced into the vehicle 200 by rough terrain over which the vehicle 200 travels may be dampened by the mechanical compliance of the wheels 216. In other words, the wheels 216 deform to absorb the shock forces resulting from traveling over rough terrain. Such shock forces may be absorbed by optional shock absorbers, spring elements, and/or dampers, such as those known to the art.

Other options include the integration of a rotary damper to add vibration-dampening suspension characteristics. In the embodiment illustrated in FIG. 5, the vehicle 200 comprises a controllable, magnetorheological (MR) fluid based, rotary damper 502 connecting the suspension arm 212 to the chassis 204, mounted in parallel with the shoulder joint 210. The rotary MR damper 502, first shown in FIG. 5 but best shown in FIG. 6A-FIG. 6C, at each suspension arm 212 provides actively variable damping torque controlled by a central computer (not shown). This control allows for optimized vehicle dynamics, improved traction, articulation, impact absorption and sensor stabilization. The system improves obstacle negotiation by enabling the shoulder joints 210 to be selectively locked, improving suspension arm 212 position control. Damping is controllable via a magnetically sensitive fluid. The fluid shear stress is a function of the magnetic flux density. The flux is generated by an integrated electromagnet that is capable of varying the resultant damping torque in real time.

The MR rotary damper 502 controls the applied torque on the shoulder joint 210 during all of the vehicle operational modes. It provides the muscle to the vehicle 200 for absorbing impacts, damping the suspension and accurately controlling the position of the joint. The MR rotary damper 502 increases traction and decreases the transmission of vertical accelerations into the chassis 204. The MR damper 502's ability to change damping force in real-time via software control maintains suspension performance over all operating conditions, such as changing wheel loads, varying wheel positions, and varying the vehicle 200 center of gravity.

Figure 6A:
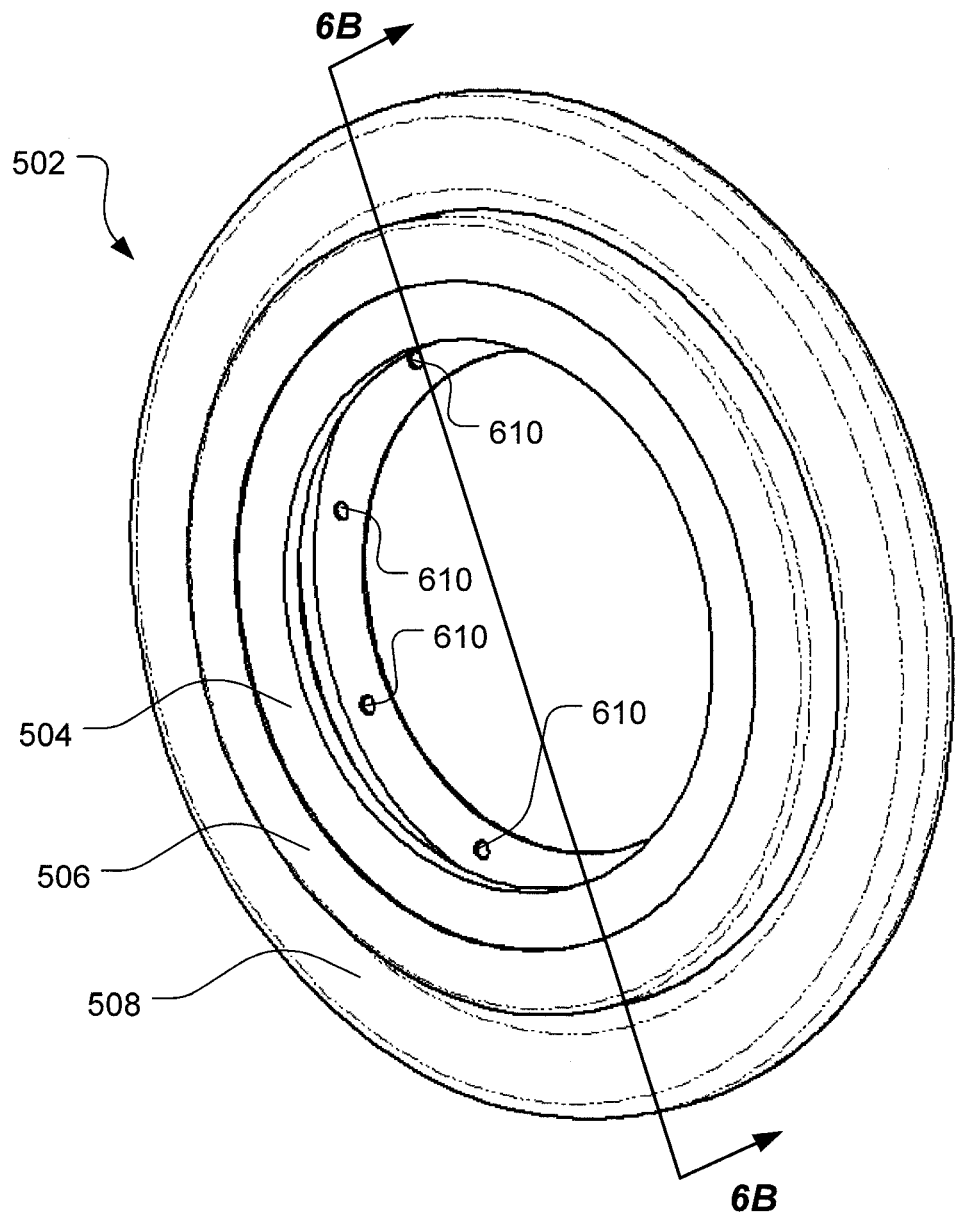
FIGS. 6A-6B are pictorial and cross-sectional views, respectively, of an illustrative embodiment of a rotary magnetorheological damper according to the present invention for use with the shoulder joint of FIGS. 3A-3B.
Figure 6B:
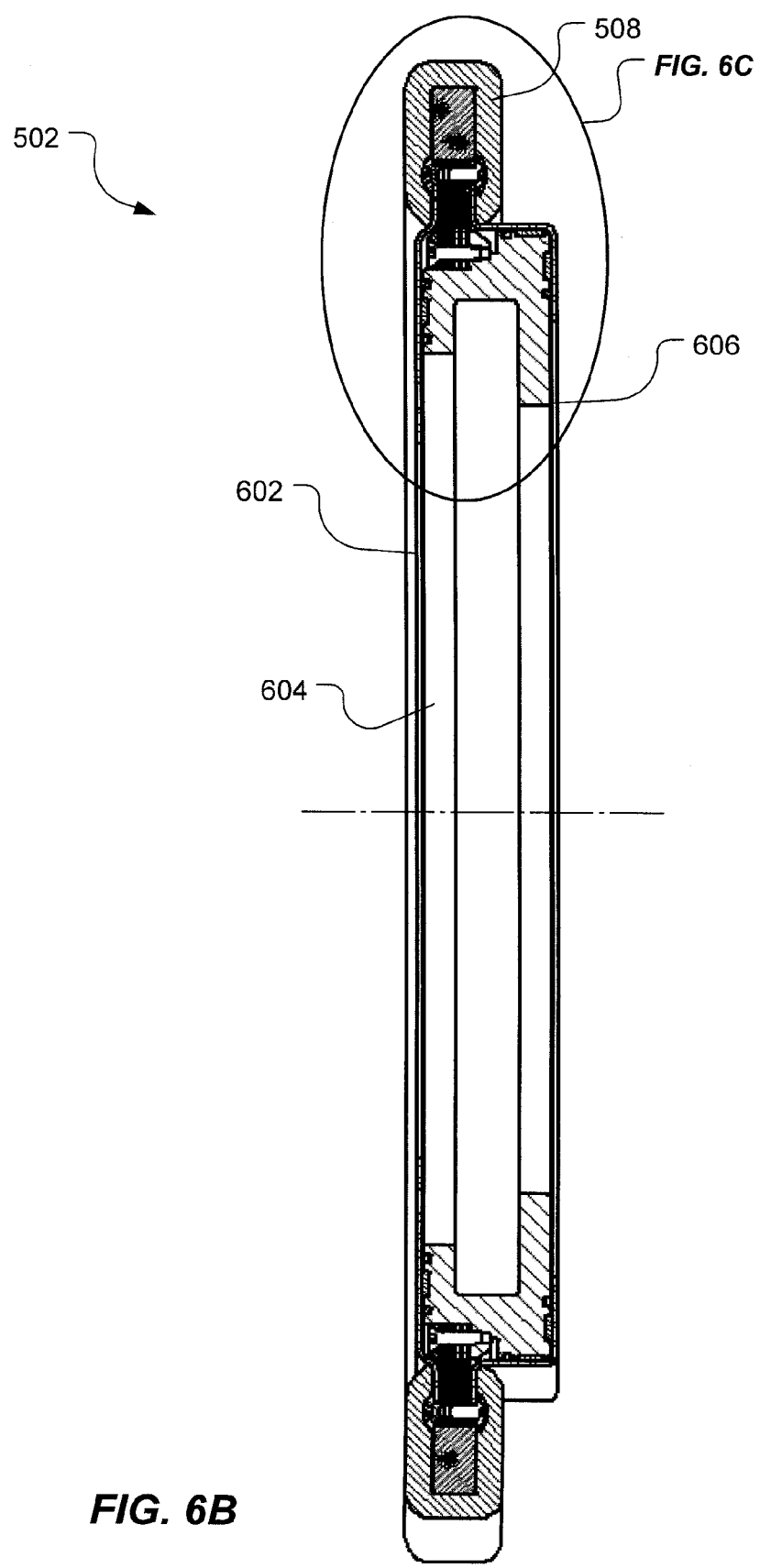
Figure 6C:
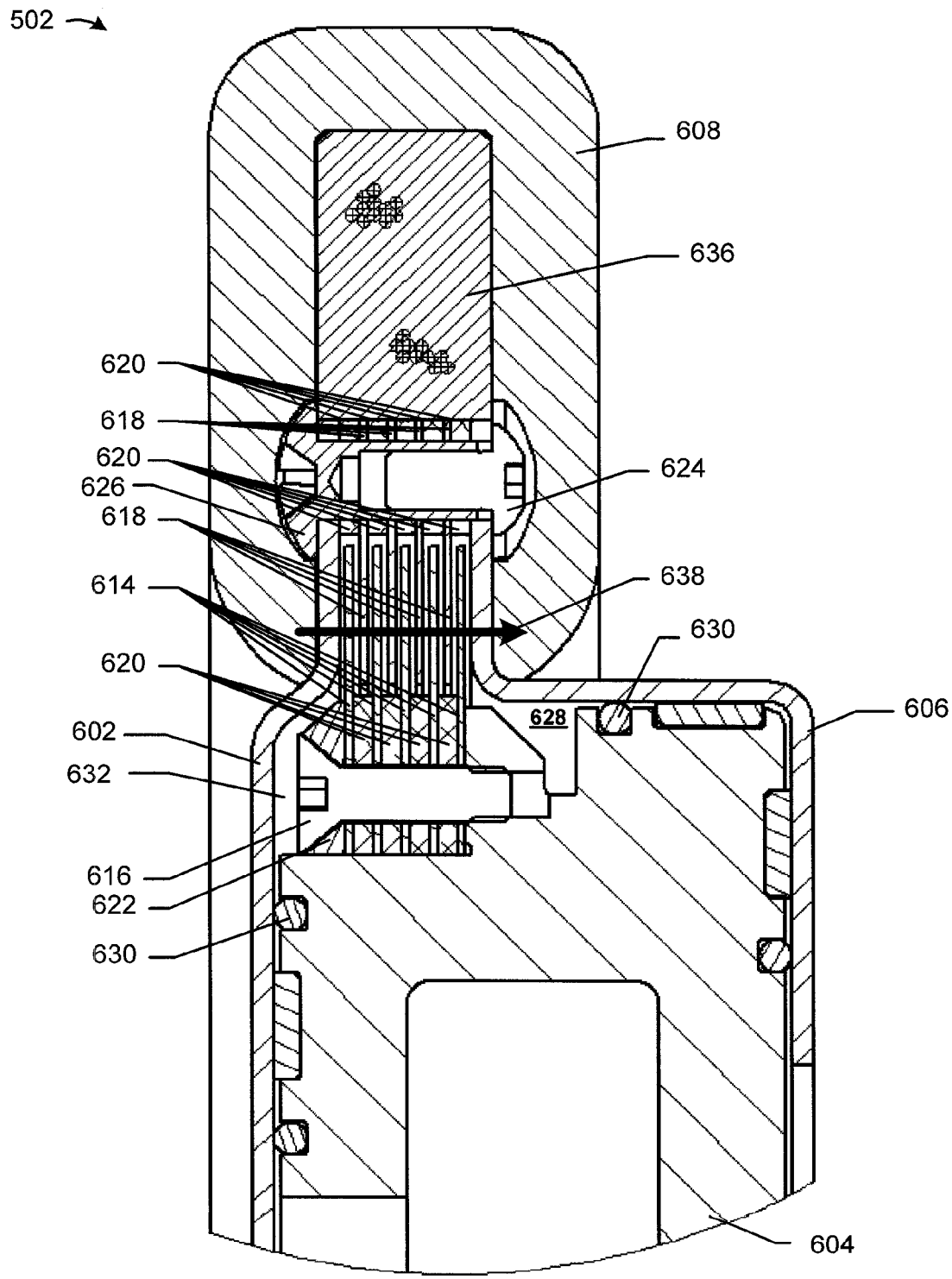
FIG. 6C is an enlarged, cross-sectional view of a portion of the damper of FIG. 6B.

Still referring to FIG. 6A-FIG. 6C, the rotary damper 502 includes an inner housing 602, a rotor 604, an outer housing 606, and a segmented flux housing 608. The inner housing 602, outer housing 606, and segmented flux housing 608 are fabricated from a "soft magnetic" material (i.e., a material with magnetic permeability much larger than that of free space), e.g., mild steel. The rotor 604 is made from a "nonmagnetic" material (i.e., a material with magnetic permeability close to that of free space), e.g., aluminum. In one embodiment, the segmented flux housing 608 is fabricated from a high performance magnetic core laminating material commercially available under the trademark HIPERCO 50® from:

Carpenter Technology Corporation P.O. Box 14662
Reading, PA 19612-4662 U.S.A. Phone: (610) 208-2000 FAX: (610) 208-3716

However, other suitable, commercially available soft magnetic materials, such as mild steel, may be used.

The rotary damper 502 is affixed to, in this particular embodiment, a chassis 204 by fasteners (not shown) through a plurality of mounting holes 610 of the inner housing 602. The rotor 604 is made to rotate with the pivoting element (not shown) with the use of splines or drive dogs (also not shown). Note that the rotary damper 502 may be affixed to the suspension arm 212 and the chassis 204 in any suitable manner known to the art. The rotary damper 502 damps the rotary movement of the arm pivot relative to the chassis 204 in a manner more fully explained below.

Referring to FIG. 6C, pluralities of rotor plates 614, separated by magnetic insulators 620, are affixed to the rotor 604 by, in this particular embodiment, a fastener 616 screwed into the rotor plate support 622 of the rotor 604. A plurality of housing plates 618, also separated by magnetic insulators 620, are affixed to an assembly of the inner housing 602 and outer housing 606, in this embodiment, by a fastener 624 in a barrel nut 626. Note that the assembled rotor plates 614 and the assembled housing plates 618 are interleaved with each other. The number of rotor plates 614 and housing plates 618 is not material to the practice of the invention.

The rotor plates 614 and the housing plates 618 are fabricated from a soft magnetic material having a high magnetic permeability, e.g., mild steel. The magnetic insulators 620, the fasteners 616, 624, and the barrel nut 626 are fabricated from nonmagnetic materials, e.g., aluminum or annealed austenitic stainless steel. The nonmagnetic fasteners can be either threaded or permanent, e.g., solid rivets. The rotor plates 614 and the housing plates 618 are, in this particular embodiment, disc-shaped. However, other geometries may be used in alternative embodiments and the invention does not require that the rotor plates 614 and the housing plates 618 have the same geometry.

Still referring to FIG. 6C, the assembled inner housing 602, rotor 604, and outer housing 606 define a chamber 628. A plurality of O-rings 630 provide a fluid seal for the chamber 628 against the rotation of the rotor 604 relative to the assembled inner housing 602 and outer housing 606. An MR fluid 632 is contained in the chamber 628 and resides in the interleave of the rotor plates 614 and the housing plates 618 previously described above. In one particular embodiment, the MR fluid 632 is MRF132AD, commercially available from:

Lord Corporation Materials Division 406 Gregson Drive P.O. Box 8012 Cary, N.C. 27512-8012 U.S.A.
Ph: 919/469-2500 FAX: 919/481-0349

However, other commercially available MR fluids may also be used.

The segmented flux housing 608 contains, in the illustrated embodiment, a coil 636, the segmented flux housing 608 and coil 636 together comprising an electromagnet. The coil 636, when powered, generates a magnetic flux in a direction transverse to the orientation of the rotor plates 614 and the housing plates 618, as represented by the arrow 638. Alternatively, a permanent magnetic 640 could be incorporated into the flux housing 608 to bias the magnetic flux 638. The coil 636 drives the magnetic flux through the MR fluid 632 and across the faces of the rotor plates 614 and the housing plates 618. The sign of the magnetic flux is not material to the practice of the invention.

The magnetic flux 638 aligns the magnetic particles (not shown) suspended in the MR fluid 632 in the direction of the magnetic flux 638. This magnetic alignment of the fluid particles increases the shear strength of the MR fluid 632, which resists motion between the rotor plates 614 and the housing plates 618. When the magnetic flux is removed, the suspended magnetic particles return to their unaligned orientation, thereby decreasing or removing the concomitant force retarding the movement of the rotor plates 614. Note that it will generally be desirable to ensure a full supply of the MR fluid 632. Some embodiments may therefore include some mechanism for accomplishing this. For instance, some embodiments may include a small fluid reservoir to hold an extra supply of the MR fluid 632 to compensate for leakage and a compressible medium for expansion of the MR fluid 632.

Returning to the illustrated embodiment, the control system commands an electrical current to be supplied to the coil 636. This electric current then creates the magnetic flux 638 and the rotary damper 502 resists relative motion between the housings 602, 606 and the rotor 604. Depending on the geometry of the rotary damper 502 and the materials of its construction, there is a relationship between the electric current, the relative angular velocity between the housings 602, 606 and the rotor 604, and the resistive torque created by the rotary damper 502. In general this resistive torque created by the rotary damper 502 increases with the relative angular motion between the housings 602, 606 and the rotor 604 and larger magnetic flux density through the fluid 632 as generated by the coil electric current.

Unfortunately, the MR rotary damper 502 tends to have a high inductance. This problem can be mitigated with the use of high control voltages which allow for high rates of change in damper current (di/dt), although this may lead to increased power demands and higher levels of inefficiency depending on the design and the software control driving the rotary damper 502. Another technique, which may improve the bandwidth and efficiency of the MR rotary damper 502, uses multiple coil windings. One such system could use two coil windings; one high inductance, slow coil with a high number of turns of small diameter wire and a second low inductance, fast coil with a low number of turns of larger diameter wire. The slow coil could be used to bias the rotary damper 502 while the fast coil could be used to control around this bias. However, the two coil windings may be highly coupled due to the mutual inductance between them in some implementations, which would be undesirable.

Returning to FIG. 5, the vehicle 200 employs a suspension arm position sensor 504 (only three shown) for each suspension arm 212. The arm position sensors 112 measure the relative position of the respective suspension arms 304 to the chassis 204. From this measurement a control system 506 can also determine the relative angular velocity of the suspension arms 304. As a simple damper, the MR rotary damper 502 would be commanded to produce a torque proportional to and against the suspension arm angular velocity. More advanced control algorithms could command the MR rotary damper 502 to produce a resistive torque related to other variables such as: the positions of the suspension arms 304 relative to the chassis 204, the vertical acceleration on the chassis 204, the vehicle roll and pitch angles and angular rates, and the wheel hub motor torques (these would be determined by the vehicle control for controlling vehicle speed and turning). The illustrated embodiments also employ an inertial sensor 508 to help measure some of these variables.

As shown in FIG. 7A-FIG. 7B, one embodiment of the suspension arm 212 has a hollow construction that is structurally efficient and provides for mounting of motors, controller, wiring, etc., within the suspension arm 212. The suspension arm 212 is subject to multidirectional bending, shocks and debris impact/wear. The suspension arm 212 is, in the illustrated embodiment, made of ceramic (alumina) fiber reinforced aluminum alloy, i.e., the suspension arm 212 comprises a "metal matrix composite" material. This material provides for high thermal conductivity, high specific stiffness, high specific strength, good abrasion resistance and long fatigue life. Some embodiments may include ceramic particulate reinforcement in at least selected portions. Alternatively, the suspension arms 212 may comprise aluminum with a carbon fiber laminated overwrap. The suspension arm 212 therefore also provides mechanical protection and heat sinking for various components that may be mounted on or in the suspension arm 212. Note that the length of the suspension arm 212 may be varied depending on the implementation. In alternative embodiments, a double "A-arm" wishbone suspension (not shown) may be used instead of the articulated, trailing suspension arm design of the illustrated embodiment.

Figure 4C:
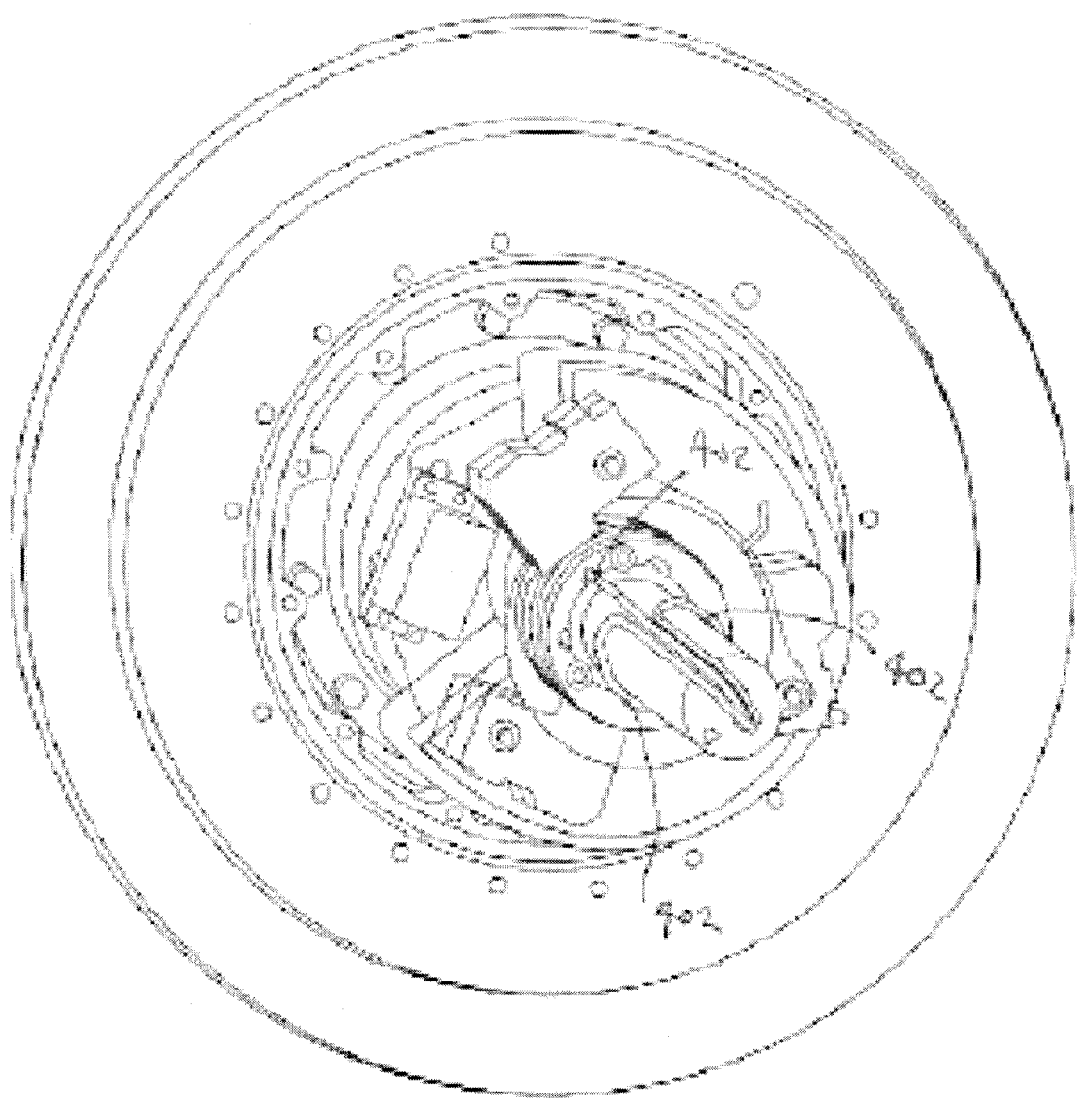

Returning to FIG. 3A-FIG. 3B, the drive 302, sensors (not shown), electronics (also not shown), slip clutch 308, and locking mechanism 400 (shown in FIG. 4A-FIG. 4C) all require power. Power is provided by the vehicle 200 (shown in FIG. 2) to each shoulder joint 210 and moreover, some power is passed through from the vehicle chassis 204 through the shoulder joint 210 and to the hub drive 214 to drive the wheel 216. In addition to power, data signals follow the same path. To pass power and data signals over the rotary shoulder joints 210, a plurality of slip rings 432, shown in FIG. 4C, are used. The supply of power should be isolated from data due to noise issues, and the illustrated embodiment employs separate slip rings to transmit power and data. Note that conductors (not shown) are attached to each side of the slip rings 432, with each side rotatably in contact with each other to maintain continuity.

Referring again to FIG. 2A-FIG. 2C, each of the wheel assemblies 202 comprises the shoulder joint 210, the suspension arm 212, the hub drive 214, and a wheel 216, as discussed above. Each of the suspension arms 212 is articulated with the chassis 204 by its shoulder joint 210. Further, each of the wheels 216 is mounted to and rotates with respect to its link structure 212 via its hub drive 214, which is capable of selectively rotating the wheel 216 (as indicated by arrows 217) at a chosen speed. Each of the drives 214 may comprise any type of drive known to the art, for example, a direct-drive motor, a servo motor, a motor-driven gear train, an engine-driven gear train, a rotary actuator, or the like. Further, each of the drives 214 may be of the same type or they may comprise different types of drives. By actuating some or all of the drives 214 at the same or different speeds, the vehicle 200 may be propelled across a surface 218 along a chosen path.

Figure 5:
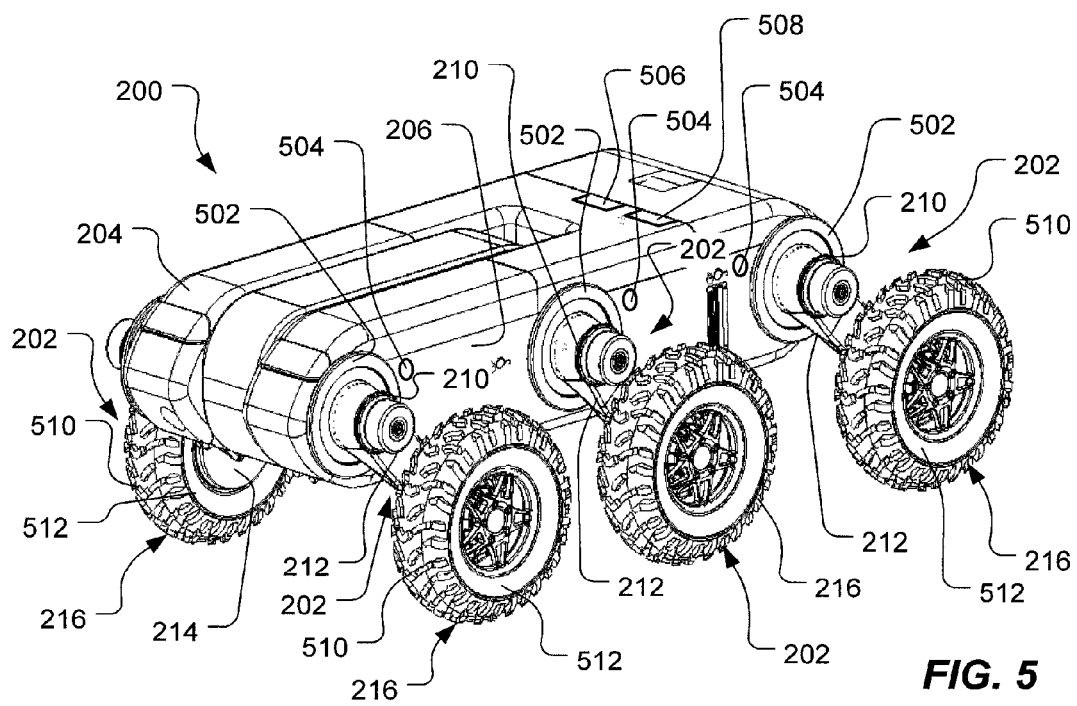
FIG. 5 is a pictorial view of an illustrative embodiment of the vehicle of FIGS. 2A-2C.

In the particular embodiment illustrated in FIG. 5, each of the wheels 216 further comprises a tire 510 mounted to a rim 512. The tire 510 may comprise any suitable tire known to the art, such as a pneumatic tire, a semi-pneumatic tire, a solid tire, or the like.

FIGS. 8A and 9-11 are cross-sectional, side views depicting the illustrated embodiment of the hub drive 214 in park mode, high speed mode, neutral mode, and low speed mode, respectively. The hub drive 214 includes a motor 802 and a transmission 804 having an input attached to the motor 802 and an output attached to the rim 112 of the wheel 108, each being disposed within the wheel 108 and, in the illustrated embodiment, being disposed within the rim 112. The motor 802 comprises a stator 806, attached to the vehicle 100 via a hub casing 808, and a rotor 810, attached to a rotor hub 812. In various embodiments, the motor 802 may comprise a variable reluctance motor, a DC brushless motor, a permanent magnet motor, or the like. In one embodiment, electrical power is provided to the motors 802 (and to other electrical equipment of the vehicle 200) by a series hybrid power plant comprising a commercial, off-the-shelf-based single cylinder air-cooled DI diesel engine (not shown) coupled with a commercial, off-the-shelf-based generator (not shown) disposed in the chassis 104 (shown in FIG. 1). The power plant is used in conjunction with at least one string of electrical energy storage devices (not shown), such as lead-acid or lithium-ion batteries, also disposed in the chassis 104, in a series-hybrid configured power train with sufficient buffering and storage in the power and energy management systems. The present invention, however, is not limited to use with the above-described power plant. Rather, any suitable electrical power source may be used to supply power to the motors 802 and the other electrical equipment.

Still referring to FIGS. 8A and 9-11, the transmission 804 comprises an epicyclic gear train 814, which further includes a sun gear 816, a plurality of planetary gears 818 engaged with the sun gear 816, and a ring gear 820 engaged with the planetary gears 818. Each of the planetary gears 818 is held in position by a spindle 826 and a carrier cover plate 822 via a shaft 824. The spindle 826 and the carrier cover plate 822 implement a planetary gear carrier. The rotor hub 812, which is attached to the rotor 810 as described above, is coupled with the sun gear 816. Thus, as the motor 802 operates, the rotor 810 is caused to rotate with respect to the stator 806 and, correspondingly, rotates the sun gear 816. In the illustrated embodiment, the planetary gear carrier 822 is attached to the rim 112 by the spindle 826 and, thus, power from the motor 802 is transmitted from the motor 802, through the epicyclic gear train 814, to the rim 112.

Various outputs or operating modes may be accomplished by placing the epicyclic gear train 814 in different operational configurations. For example, the hub drive 214 may be placed in park mode, shown better in FIGS. 8A-8B, by locking the planetary gear carrier 822 to the sun gear 816 and by locking the ring gear 820 to the hub casing 808, as will be discussed further below, to prevent the epicyclic gear train 814 from transmitting power therethrough. Further, the hub drive 214 may be placed in high speed mode, illustrated better in FIG. 9, by locking the planetary gear carrier 822 to the sun gear 816 and by allowing the ring gear 820 to rotate freely, causing the spindle 826 to rotate at the same speed as the rotor 810.

Figure 10:
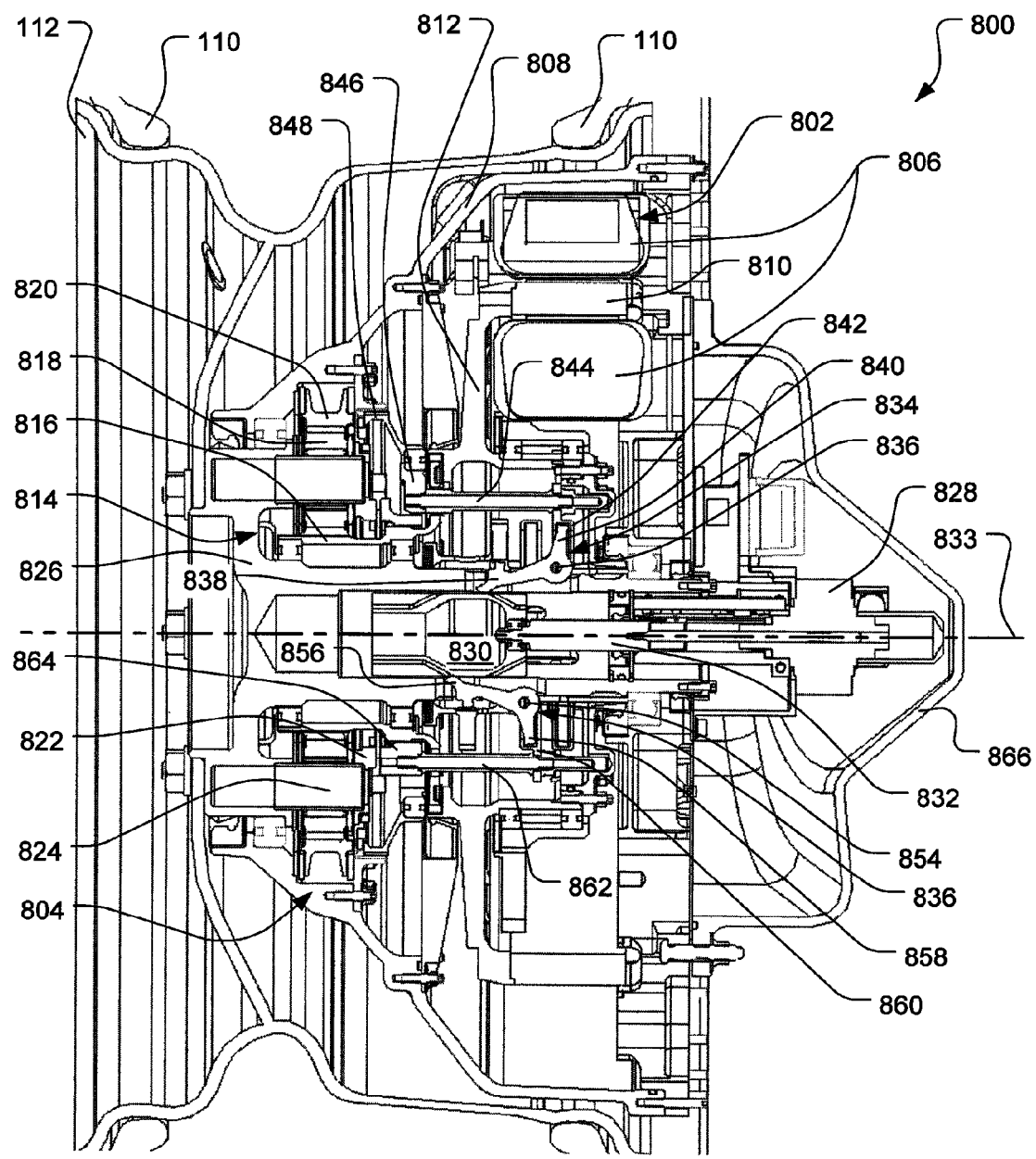

Further, to place the hub drive 214 in neutral mode, illustrated better in FIG. 10, the spindle 826 is allowed to rotate freely by causing the planetary gear carrier 822 to rotate independently of the sun gear 816 and by causing the ring gear 820 to rotate freely. The hub drive 214 may be placed in low speed mode, illustrated better in FIG. 11, by reducing the rotational speed of the spindle 826 with respect to the rotor 810. In this configuration, the planetary gear carrier 822 is allowed to rotate independently of the sun gear 816 and the ring gear 820 is locked to the hub casing 808, which causes the sun gear 816 to rotate the planetary gears 818 against the fixed ring gear 820, driving the planetary gear carrier 822 and the spindle at a lower speed than the sun gear 816.

To effect these configurations, the transmission 804 illustrated in FIGS. 8A-11 includes a shift motor 828 that linearly actuates a shift drum 830 via a shift pin 832 along an axis 833. As the shift drum 830 is moved to various positions by the shift motor 828, the epicyclic gear train 814 is shifted into the various operating modes by pivoting a first shift lever 834 and/or a second shift lever 836 via the shift drum 830. Referring now to FIG. 8B, which provides an enlarged view of a portion of the transmission 804 of FIG. 8A, the first shift lever 834 is pivotably mounted by a pin 836, such that a first leg 838 of the first shift lever 834 is biased against the shift drum 830. A second leg 840 of the first shift lever 834 extends into a first shift ring 842, which is attached to a first shift spacer 844. The first shift spacer 844 is attached to a ring gear dog hub 846, which is attached to a ring gear dog ring 848.

Figure 11:
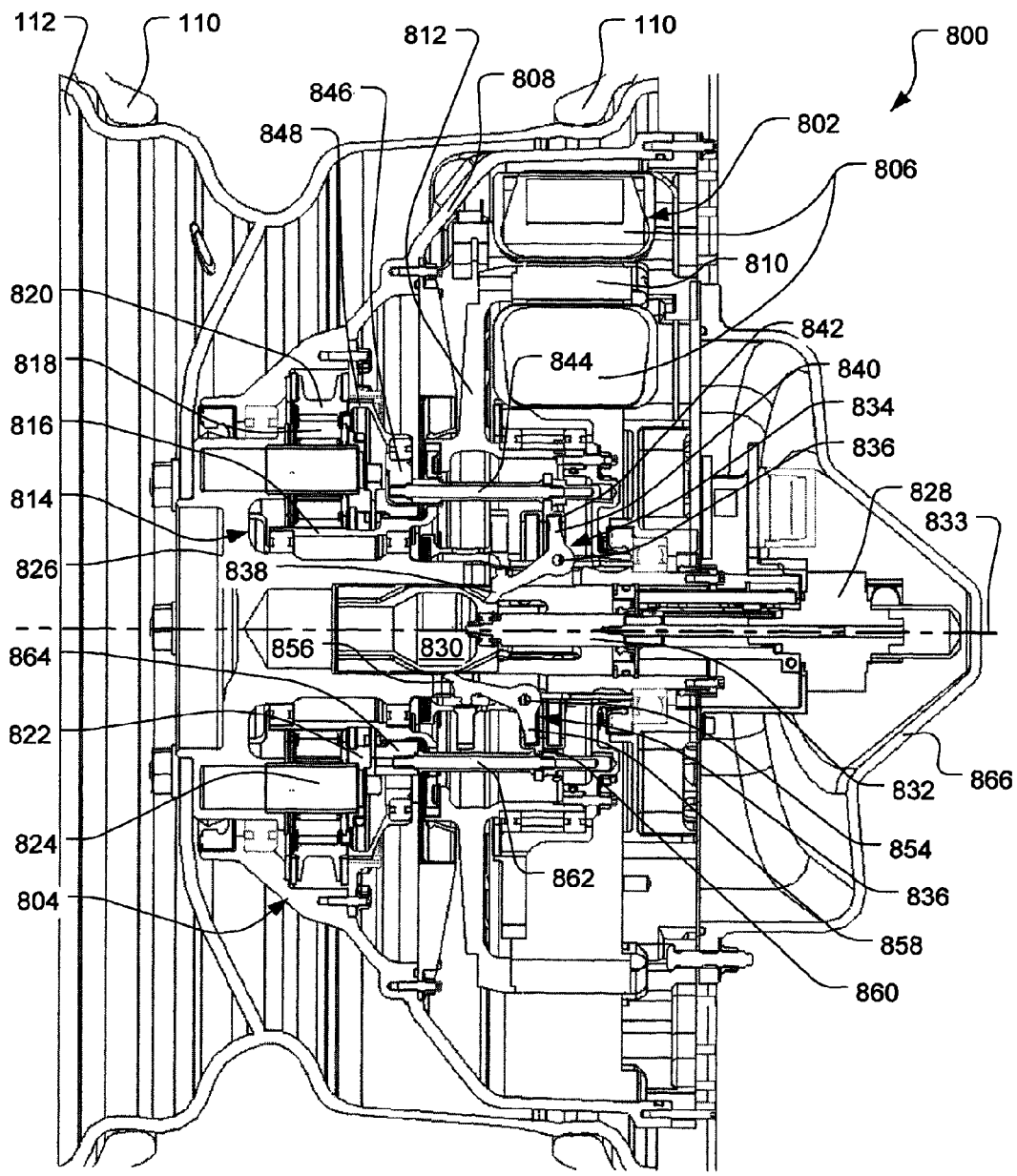

The ring gear dog ring 848 may be selectively contacted to the ring gear 820 to lock the ring gear 820 to the hub casing 808. For example, when the first shift lever 834 is pivoted by the shift drum 830 such that the first leg 838 thereof moves away from the axis of motion 833 of the shift drum 830, the ring gear dog ring 848 is disengaged from the ring gear 820, as shown in FIGS. 9 and 10. Conversely, when the first shift lever 834 is pivoted by the shift drum 830 such that the first leg 838 thereof moves toward the axis of motion 833 of the shift drum 830, the ring gear dog ring 848 is engaged with the ring gear 820, as depicted in FIGS. 8A, 8B, and 11.

Similarly, the transmission 804 further comprises a second shift lever 852 that is pivotably mounted by a pin 854, such that a first leg 856 of the second shift lever 852 is biased against the shift drum 830. A second leg 858 of the second shift lever 852 extends into a second shift ring 860, which is attached to a second shift spacer 862. The second shift spacer 862 is attached to a planetary carrier dog ring 864. The planetary carrier dog ring 864 may be selectively contacted to the planetary carrier 822 to lock the planetary gear carrier 822 to the sun gear 816. For example, when the second shift lever 852 is pivoted by the shift drum 830 such that the first leg 856 thereof moves away from the axis of motion 833 of the shift drum 830, the planetary carrier dog ring 864 is disengaged from the planetary gear carrier 822, as shown in FIGS. 9 and 10. Conversely, when the second shift lever 852 is pivoted by the shift drum 830 such that the first leg 856 moves toward the axis of motion 833 of the shift drum 830, the planetary carrier dog ring 864 is engaged with the planetary gear carrier 822, as shown in FIGS. 8A, 8B, and 9. A cover 866 is employed in one embodiment to protect the hub drive 814 from debris.

Figure 8A:
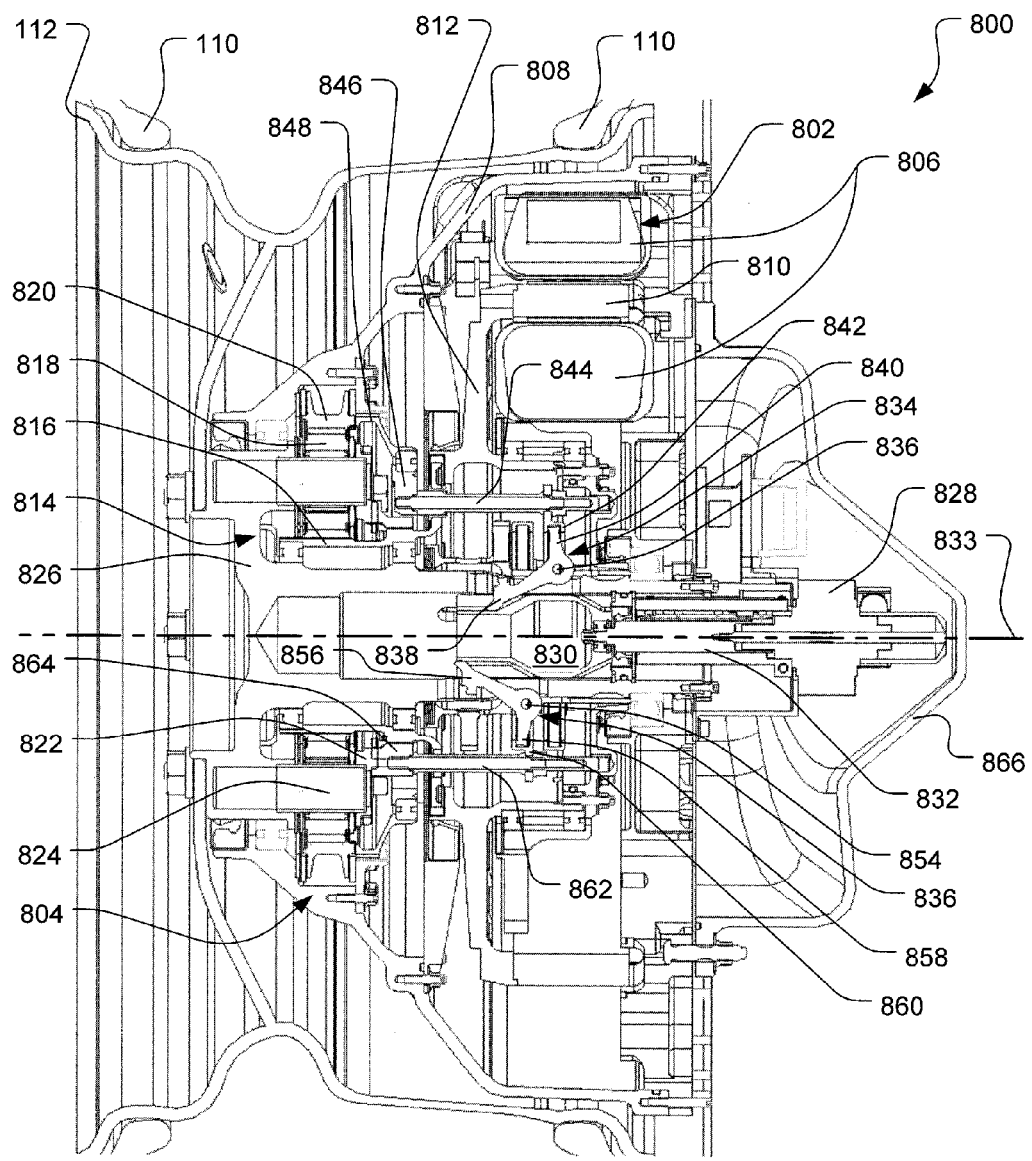
FIG. 8A is a cross-sectional view of an illustrative embodiment of a hub drive according to the present invention in park mode.
Figure 8B:
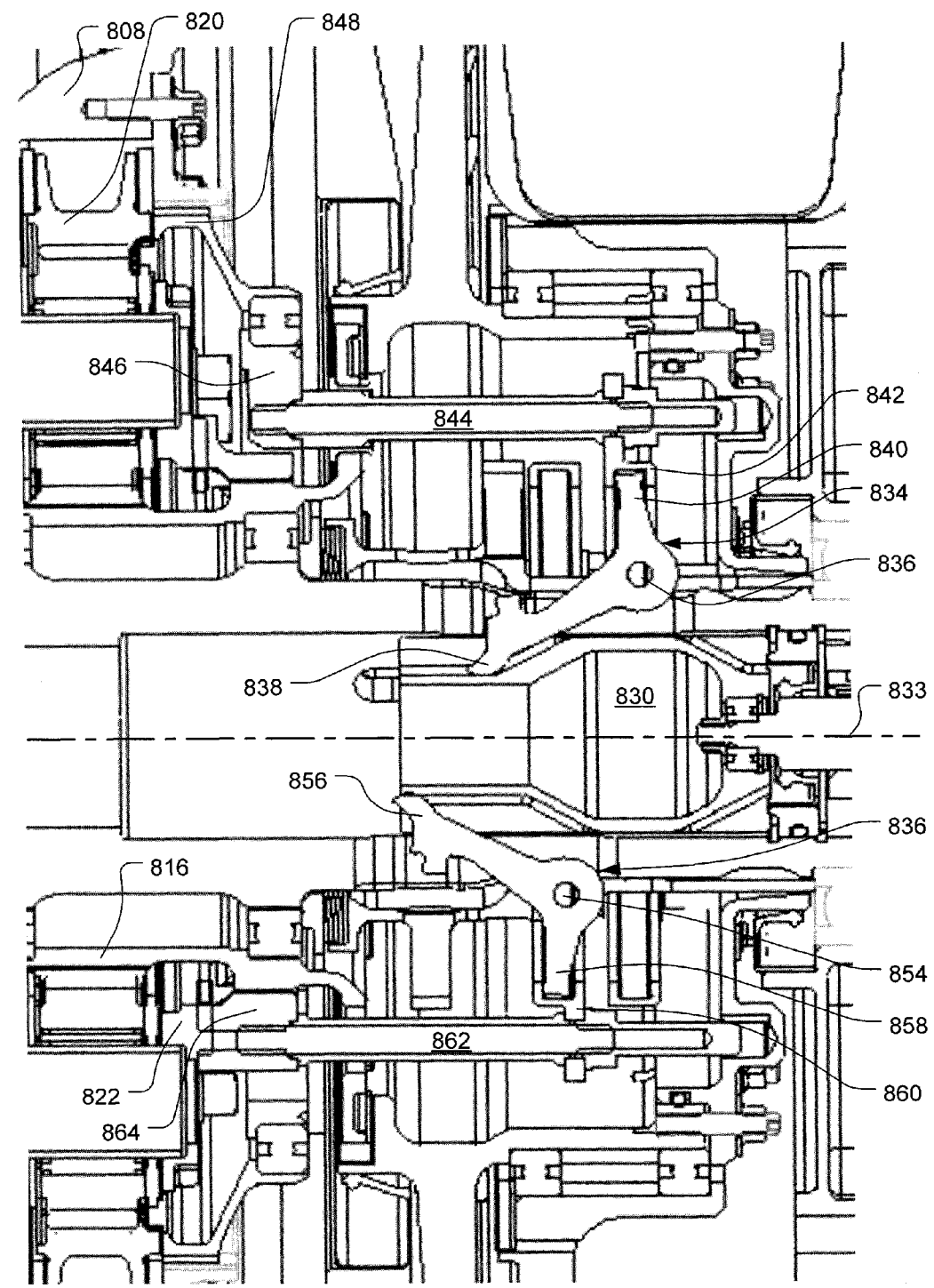
FIG. 8B is an enlarged view of a portion of the hub drive of FIG. 8A.
Figure 9:
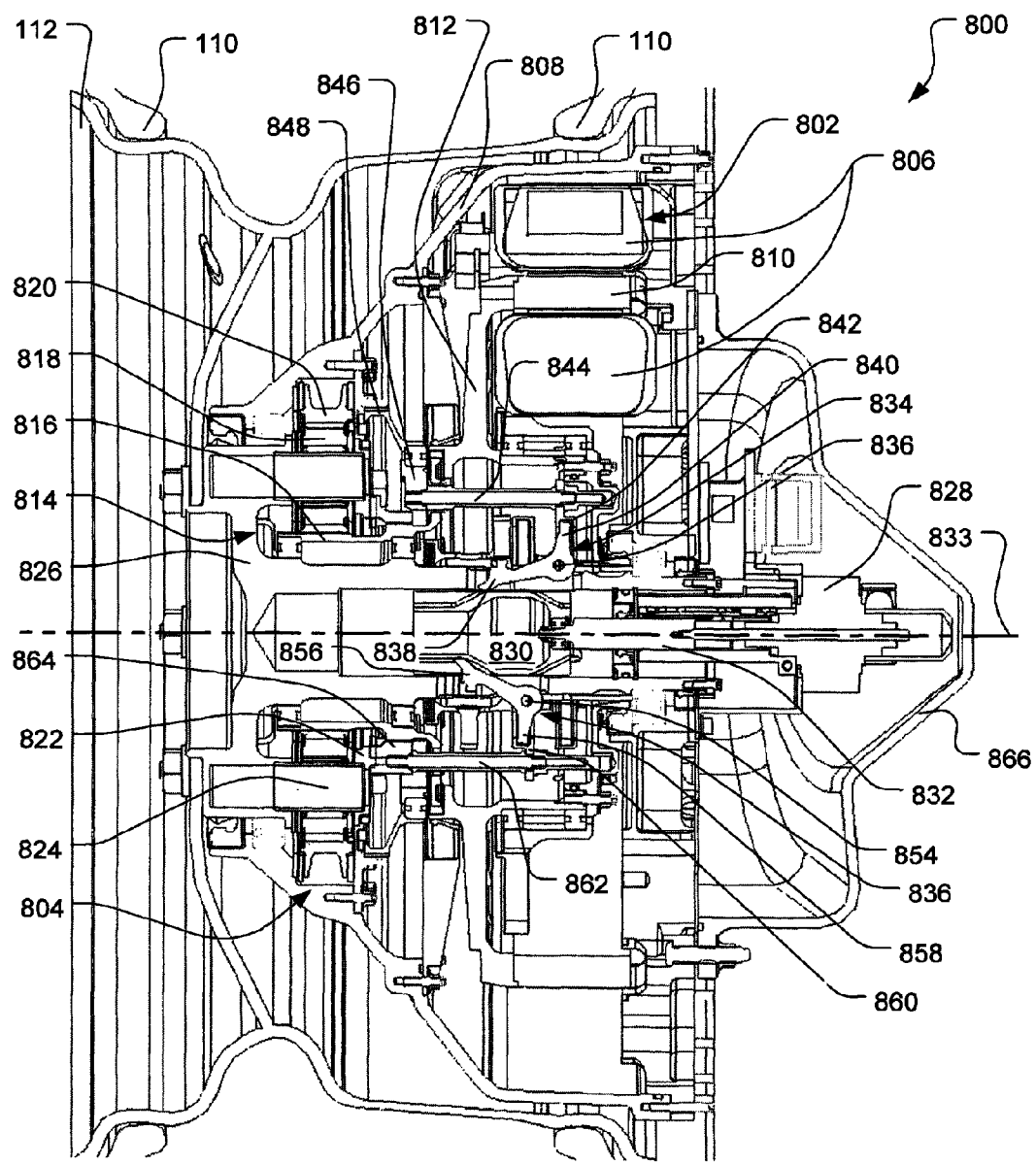
FIGS. 9-11 are cross-sectional views of the hub drive of FIG. 8A in high speed, neutral, and low speed modes, respectively.

FIGS. 8A-8B illustrate the hub drive 214 in its park configuration. In the illustrated embodiment, the shift drum 830 is in its far outboard position. In this configuration, the first shift lever 834 is pivoted such that the planetary carrier dog ring 864 is engaged with the planetary gear carrier 832, thus locking the planetary gear carrier 832 to the sun gear 816. Further, the second shift lever 836 is pivoted such that the ring gear dog ring 848 is engaged with the ring gear 820, thus locking the ring gear 820 to the hub casing 808. As a result, the rotor 810 and the stator 806 of the motor 802 are inhibited from moving relative to each other and the spindle 826 is inhibited from rotating.

FIG. 9 depicts the hub drive 214 in its high speed configuration. In the illustrated embodiment, the shift drum 830 is positioned inboard of its park position, shown in FIG. 8A. In this configuration, the first shift lever 834 is pivoted such that the planetary carrier dog ring 864 is engaged with the planetary gear carrier 832, thus locking the planetary gear carrier 832 to the sun gear 816. Further, the second shift lever 836 is pivoted such that the ring gear dog ring 848 is disengaged from the ring gear 820, thus allowing the ring gear 820 to rotate freely. As a result, the spindle 826 is locked to the ring gear 820, creating a direct drive. In other words, the spindle 826 and the rim 112 rotates at the same speed as the motor 802.

FIG. 10 depicts the hub drive 214 in its neutral configuration. In the illustrated embodiment, the shift drum 830 is positioned inboard of its high speed position, shown in FIG. 3. In this configuration, the first shift lever 834 is pivoted such that the planetary carrier dog ring 864 is disengaged from the planetary gear carrier 832, allowing the planetary gear carrier 832 to rotate independently of the sun gear 816. Further, the second shift lever 836 is pivoted such that the ring gear dog ring 848 is disengaged from the ring gear 820, thus allowing the ring gear 820 to rotate freely. As a result, the spindle 826 may rotate independently of any rotation by the motor 802.

FIG. 11 shows the hub drive 214 in its low speed configuration. In the illustrated embodiment, the shift drum 830 is in its far inboard position. In this configuration, the first shift lever 834 is pivoted such that the planetary carrier dog ring 864 is disengaged from the planetary gear carrier 832, thus allowing the planetary gear carrier 832 to rotate independently of the sun gear 816. Further, the second shift lever 836 is pivoted such that the ring gear dog ring 848 is engaged with the ring gear 820, thus locking the ring gear 820 to the hub casing 808. As a result, the sun gear 816 rotates the planetary gears 818 against the fixed ring gear 820, thus driving the planetary gear carrier 832 and the spindle 826 at a lower speed than the motor 802.

While the shift drum 830 is described above as being in a particular inboard/outboard position corresponding to a particular operational mode, the present invention is not so limited. Rather, the scope of the present invention encompasses various designs of the hub drive 214 in which the shift drum 830 is moved to positions different than those described above to achieve the various operational modes thereof. For example, one embodiment of the hub drive 214 may be configured such that the shift drum 830 operates obversely to the operation shown in FIGS. 8A-11. In such an embodiment, the shift drum 830 may be moved from a far inboard position through intermediate positions to a far outboard position to shift the hub drive 214 from the park mode, the high speed mode, the neutral mode, to the low speed mode. Thus, the particular embodiments of the hub drive 214 disclosed above may be altered or modified, and all such variations are considered within the scope of the present invention.

The hub drive 214 is capable of rotating the wheel 108 (each shown in FIG. 1) in either direction. The rotational direction of the transmission 204 may be changed by changing the rotational direction of the motor 202. The rotational direction of the motor 202 may be changed by techniques known to the art depending upon the type of motor used.

Changing the rotational direction of the motor 202 and, thus, the rotational direction of the hub drive 101, may also be used to brake the hub drive 101 by using the motor 202 as a generator to develop negative "braking" torque. For example, if the hub drive 101 is rotating in a first direction and the motor 202 is switched such that it is urged to rotate in a second direction, the motor 202 will be "backdriven" to brake the hub drive 101.

Thus, by combining the shifting capability of the transmission 804 and the capability of the motor 802 to rotate in both directions, the hub drive 214 is capable of rotating the wheel 108 in either direction and in the low speed mode (illustrated in FIG. 5) or the high speed mode (illustrated in FIG. 3). Further, the hub drive 214 is capable of braking while rotating in either direction in the low speed mode or the high speed mode. Further, by placing the hub drive 214 in the park mode, the hub drive 214 is inhibited from rotating and, thus, no additional "parking brake" is required. Yet further, by placing the hub drive 214 in the neutral mode, the wheel 108 may rotate freely, irrespective of the rotation of the motor 802.

Figure 12:
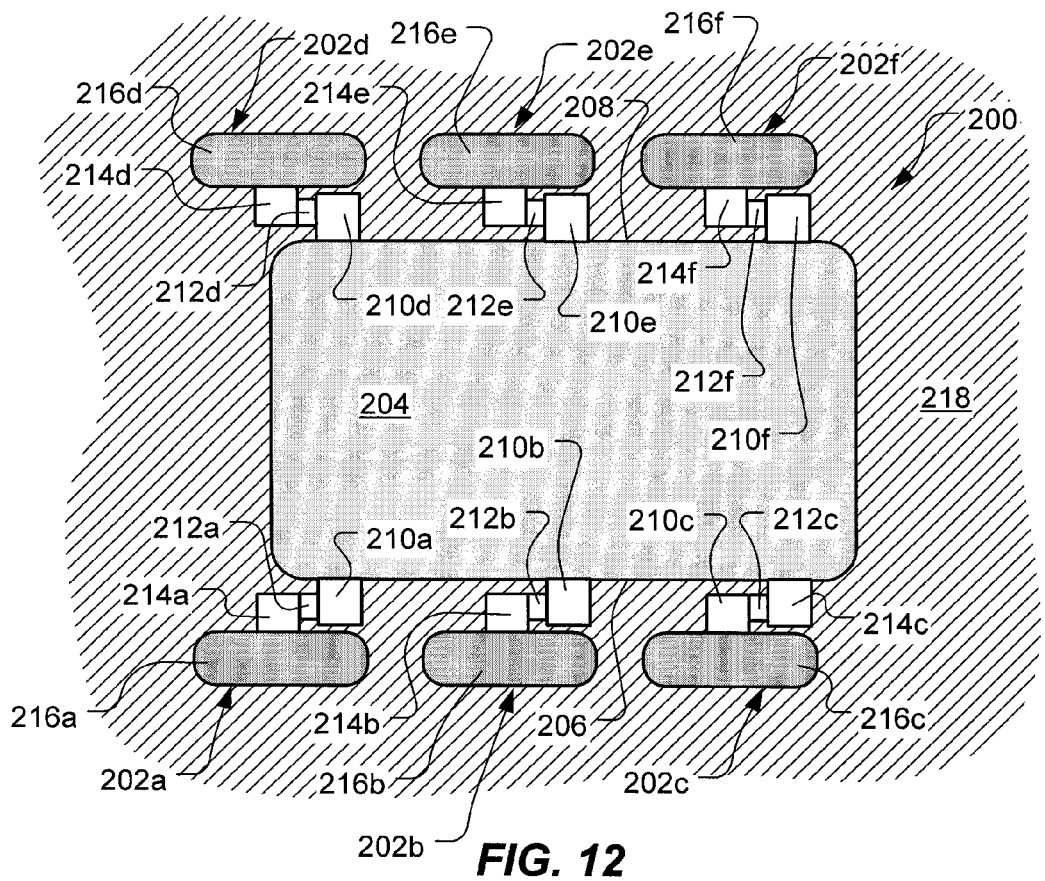
FIGS. 12-13 are stylized, top, plan and side elevational views, respectively, of the vehicle of FIGS. 2A-2C configured to travel under an overhang and having a lower center of gravity.
Figure 13:
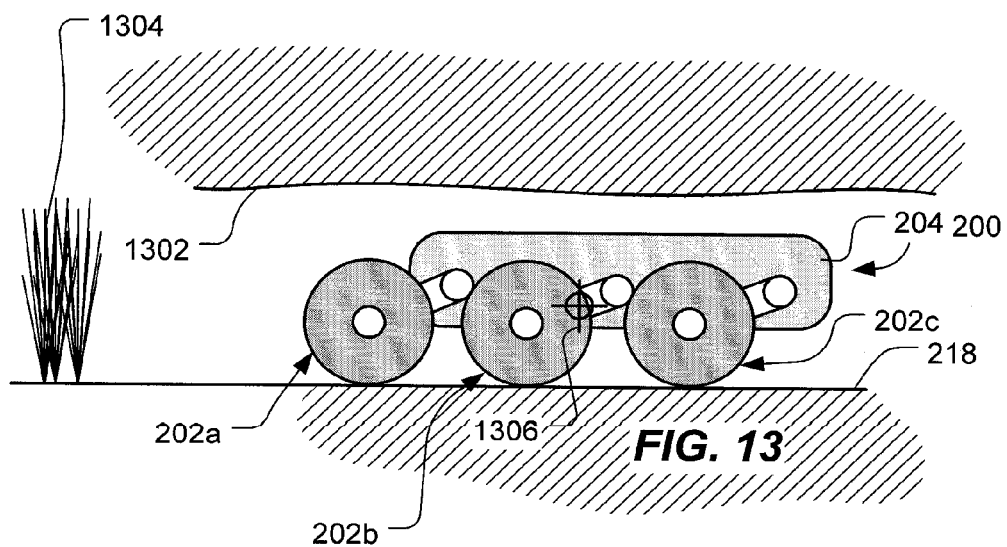

FIGS. 12-26 illustrate some of the capabilities of the vehicle 200. In these figures, the wheel assemblies 202 and the wheels 216 of FIGS. 2A-2C are labeled 202a-202f and 216a-216f, respectively, for clarity in describing the operation of the vehicle 200. As shown in FIGS. 12-13, the chassis 204 of the vehicle 200 may be lowered toward the surface 218 (as compared to the configuration of the vehicle 200 in FIGS. 2A-2B) by rotating each of the wheel assemblies 202a-202f with respect to the chassis 204. Such a configuration may be desirable, for example, when moving the vehicle 200 along the surface 218 at higher speeds, because the vehicle 200 has a lower center of gravity 1306 and is thus less likely to tip over. Such a configuration may also be desirable for moving the vehicle 200 within a volume under an overhang 1302 having limited height.

In certain situations, such as in combat, it may be desirable to minimize the likelihood of the vehicle 200 being detected by opposing forces. In smaller vehicles, detectability may be reduced by reducing the height or "presented area" of a vehicle or by hiding in brush or other clutter found proximate the vehicle. Accordingly, lowering the chassis 204 toward the surface 218, as shown in FIG. 13, allows the vehicle 200 to present a smaller area for detection and, depending upon the environment, may allow the vehicle 200 to be at least partially concealed by brush 1304 near the vehicle 200.

Figure 14:
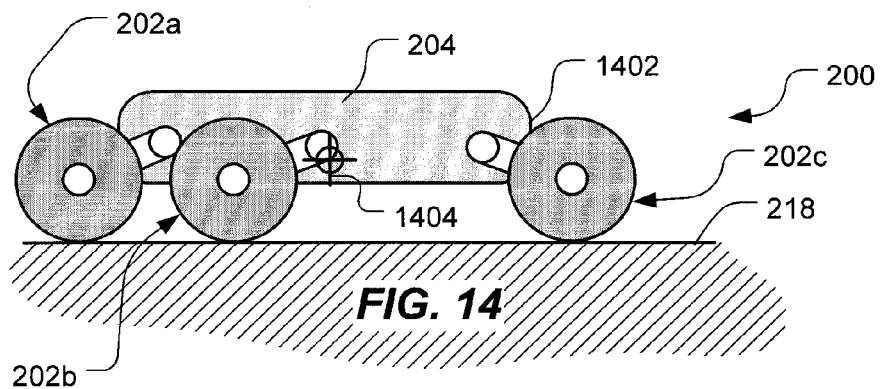
FIG. 14 is a stylized, side, elevational view of the vehicle of FIGS. 2A-2C configured to laterally change its center of gravity.

It may also be desirable in certain situations to adjust the center of gravity of the vehicle laterally to provide more stability. Referring now to FIG. 14, the vehicle 200 is configured such that the wheel assembly 202c and the wheel assembly 202f (behind the wheel assembly 202c but not shown in FIG. 3B) extend beyond an end 1402 of the chassis 204. For example, the center of gravity of the vehicle 200 may generally be at 1306, as configured in FIG. 13, while the center of gravity of the vehicle 200 may generally be at 1404, as configured in FIG. 14. Such a configuration may be advantageous if, for example, the cargo, personnel, armament delivery system, or the like being carried in or on the chassis 204 is weighted more toward the end 1402.

Figure 15:
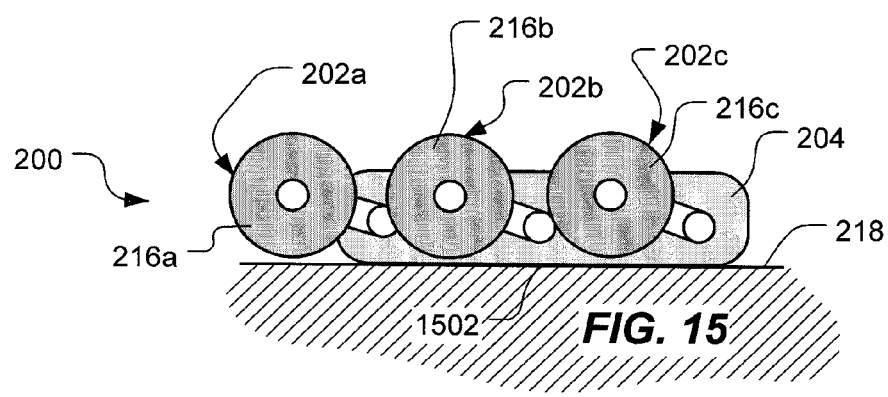
FIG. 15 is a stylized, side, elevational view of the vehicle of FIGS. 2A-2C with the chassis thereof resting on a surface.

Referring now to FIG. 15, it may be desirable in certain situations to lower the chassis 204 such that a lower surface 1502 thereof rests on the surface 218. Such a configuration may be attained by rotating the wheel assemblies 202a-202f until the lower surface 1502 contacts the surface 218 and the wheels 216a-216f are lifted off the surface 218. This configuration may be desirable, for example, for loading or unloading personnel, cargo, and/or armaments to or from the chassis 204. It also may be desirable, while the vehicle 200 is moving, to lower the chassis 204 such that the lower surface 1502 contacts the surface 218, so that the vehicle 200 may be quickly stopped.

Figure 16:
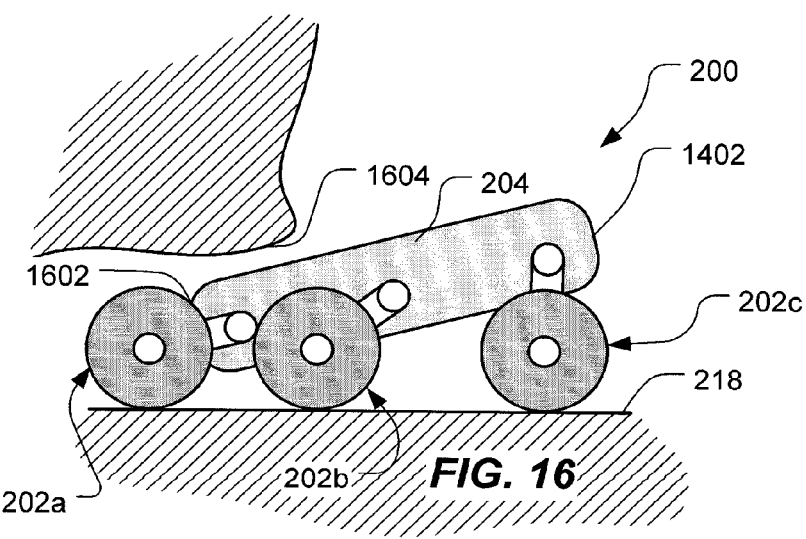
FIG. 16 is a stylized, side, elevational view of the vehicle of FIGS. 2A-2C configured such that the chassis thereof is pitched to extend under an overhang.

As shown in FIG. 16, the vehicle 200 is capable of taking on various configurations such that the chassis is pitched or sloped generally in the traveling direction of the vehicle 200. In the illustrated embodiment, the wheel assemblies 202a, 202d are set at a first orientation with respect to the chassis 204, the wheel assemblies 202b, 202e are set at a second orientation, and the wheel assemblies 202c, 202f are set at a third orientation to achieve a particular pitch orientation of the chassis 204. By varying the first, second, and third orientations with respect to the chassis 204, various pitch orientations of the chassis 204 may be achieved. In other words, the orientations of the wheel assemblies 202a-202f with respect to the chassis 204 are set such that the end 1402 is a greater distance from the surface 218 than an end 1602. Orienting the pitch of the chassis 204 may be helpful, for example, if it is desired for the vehicle 200 to position itself partially under an overhang 1604 or to aid personnel in traversing an obstacle, as will be described below in regard to FIG. 26.

Figure 17:
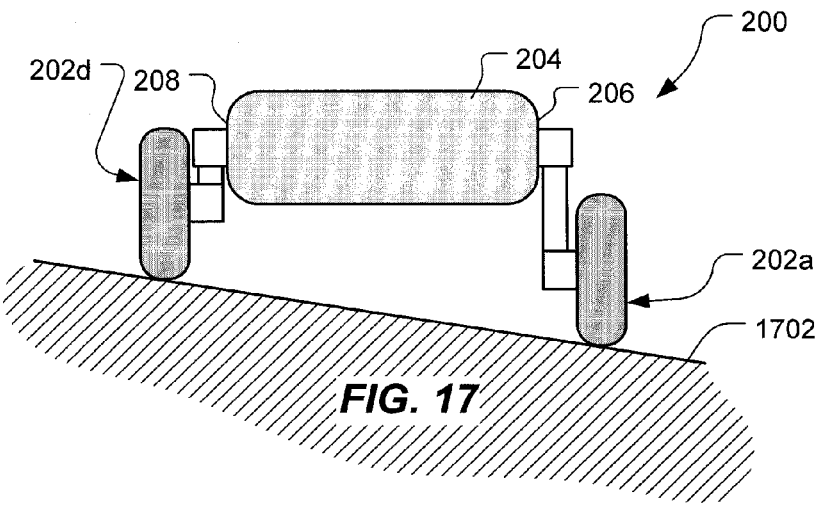
FIG. 17 is a stylized, end, elevational view of the vehicle of FIGS. 2A-2C disposed on a sloped surface and configured such that the chassis is generally level.

As illustrated in FIG. 17, it may be desirable in some situations for the vehicle 200 to attain a configuration in which the chassis 204 has a particular roll orientation with respect to a surface 1702. The orientations of the wheel assemblies 202a-202f with respect to the chassis 204 are set such that the first side 206 is a greater distance from the surface 1702 than the second side 208. Such an orientation may be advantageous if it is desired, for example, for the chassis 204 to maintain a generally horizontal attitude while traversing the sloped surface 1702. As one skilled in the art would appreciate, many pitch, roll, and pitch/roll orientations may be attained by varying the individual rotational orientations of each wheel assembly 202a-202f.

Referring now to FIG. 18, the vehicle 200 may be steered along a particular path 1802 by varying the rotational velocities of each of the wheels 216a-216f with respect to one another. For example, to traverse from a location generally at 1804 to a location generally at 1806, the velocity of the wheels 216d-216f is greater than the velocity of the wheels 216a-216c. The difference in velocity of the wheels 216d-216f as compared to the velocity of the wheels 216a-216c produces a right turn movement. To traverse from the location generally at 1806 to a location generally at 1808, the velocity of the wheels 216d-216f is less than the velocity of the wheels 216a-216c. This difference in velocity of the wheels 216d-216f as compared to the velocity of the wheels 216a-216c produces a left turn movement. In the illustrated embodiment, all of the wheels 216a-216f are generally in contact with the surface 218. This approach is known as "skid steering", as at least some of the wheels 216a-216f are skidding across the surface 218, rather than merely rolling thereacross.

Further, as illustrated in FIG. 19, the vehicle 200 may turn or spin in place, as indicated by an arrow 1902. Such a maneuver is known as "skid steering". To accomplish this maneuver, the wheels 216a-216c turn in a first direction, as indicated by an arrows 1904, at a chosen speed and the wheels 216d-216f turn in a second direction that is counter to the first direction, as indicated by an arrow 1906, at the chosen speed. The vehicle 200 may turn or spin in a direction counter to that indicated by the arrow 326 by reversing the directions of the wheels 216a-216c and 216d-216f.

Figure 20A:
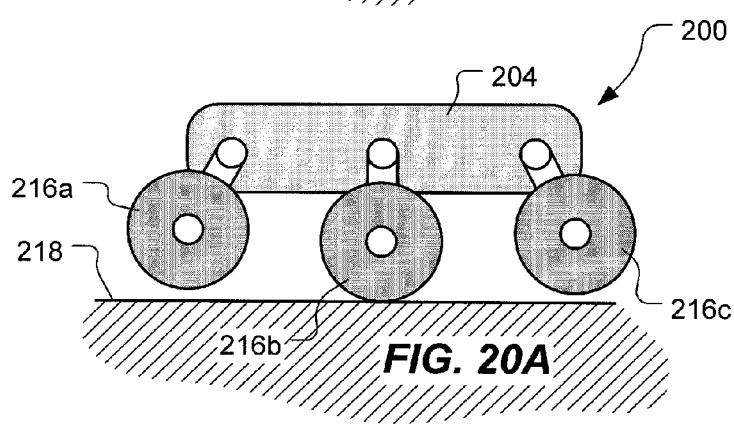
FIGS. 20A-20B are stylized side, elevational and top, plan views of the vehicle of FIGS. 2A-2C having wheel assemblies configured as outriggers.
Figure 20B:
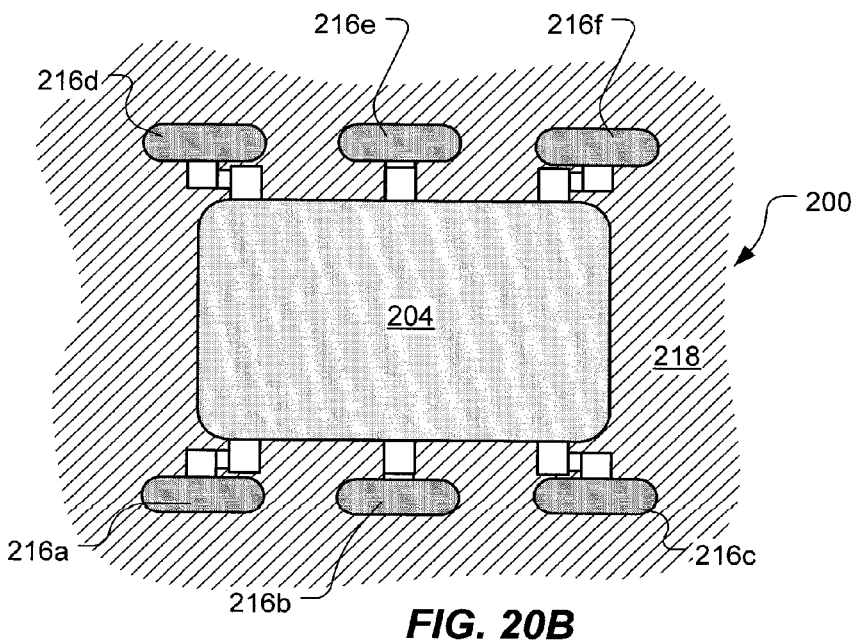

It may be desirable in some situations for the vehicle 200 to be steered such that skidding of the wheels 216a-216f is lessened. Referring now to FIGS. 20A-20B, the wheels 216a, 216c, 216d, 216f are raised off the surface 218, such that the "footprint" of the vehicle is changed and primary support for the chassis 204 is provided by the wheels 216b, 216e. In this configuration, the wheels 216b, 216e are rotated to turn the vehicle 200, while the wheels 216a, 216c, 216d, 216f act as outriggers to stabilize the vehicle 200 during the turn.

Figure 21A:
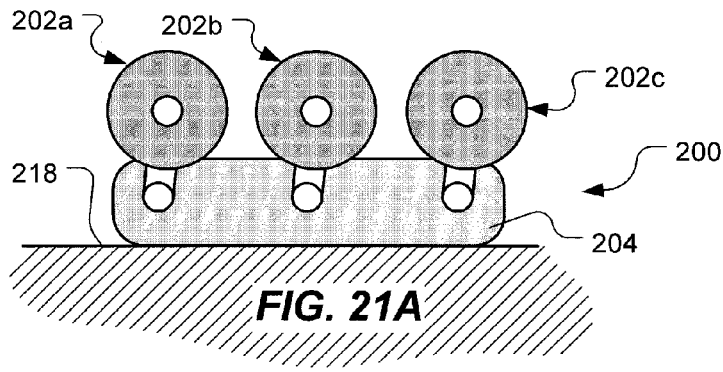
FIGS. 21A-21C are stylized, side, elevational views of the vehicle of FIGS. 2A-2C illustrating the vehicle recovering from a rollover.
Figure 21B:
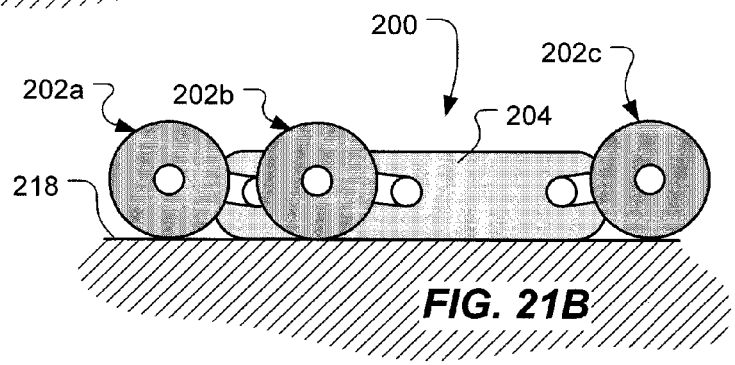
Figure 21C:
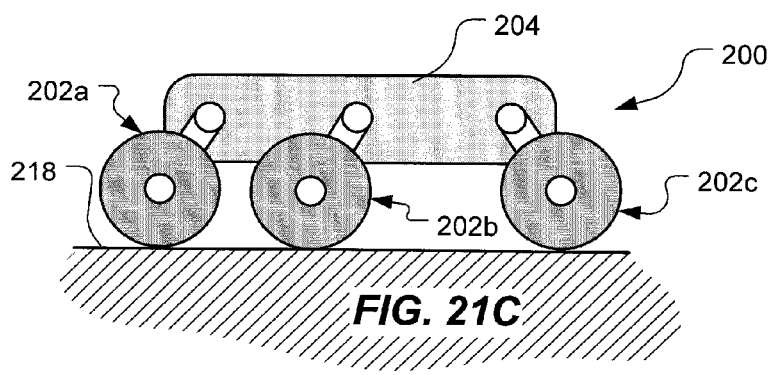

As illustrated in FIG. 21A, the vehicle 200 may encounter terrain so rugged or sloped that the vehicle 200 is turned over. As shown in FIG. 21B, the vehicle 200 may continue to traverse across the surface 218 by rotating the wheel assemblies 202a-202f such that the wheels 214a-214f contact the surface 218. As shown in FIG. 21C, the wheel assemblies 202a-202f may then be further rotated to lift the chassis 204 from the surface 218, and the vehicle 200 may continue to traverse across the surface 218.

Figure 22:
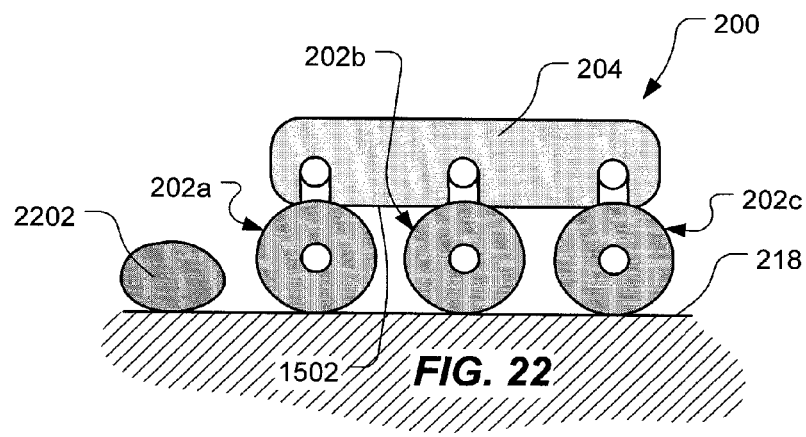
FIG. 22 is a stylized, side, elevational view of the vehicle of FIGS. 2A-2C configured such that it may move over an obstacle.

Referring now to FIG. 22, the vehicle may encounter an obstacle 2202 that would block its progress if it were in a configuration such as that shown in FIG. 2C. The wheel assemblies 202a-202f may be oriented with respect to the chassis 204 such that sufficient clearance is provided between the surface 218 and the lower surface 1502 for the vehicle 200 to travel over the obstacle 2202.

Figure 23A:
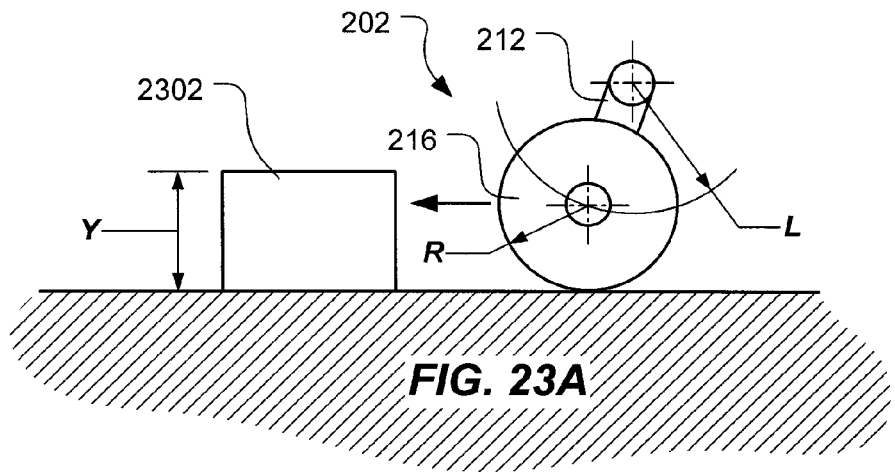
FIGS. 23A-23B are diagrams illustrating vehicle obstacle negotiation according to the present invention.
Figure 23B:
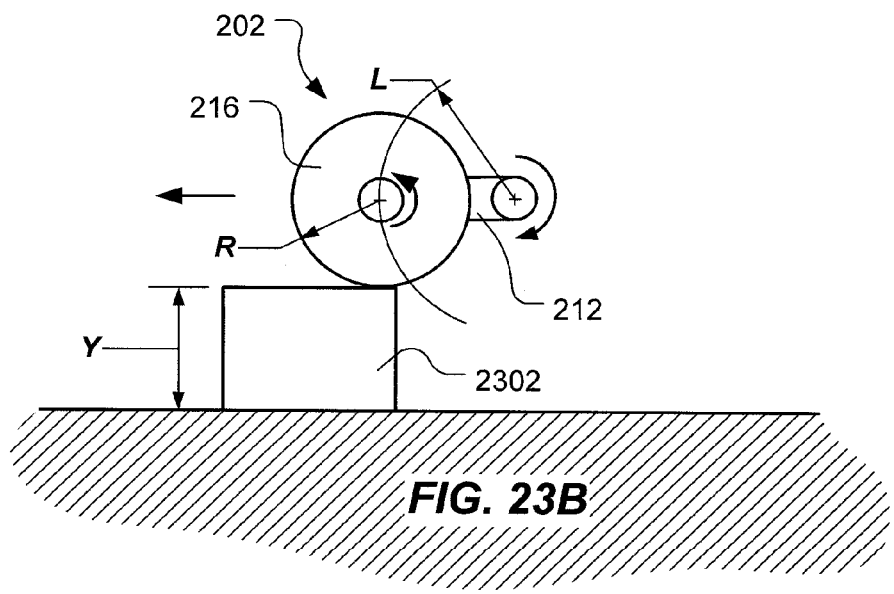

Some obstacles, however, may be too tall for the vehicle 200 to travel over in the configuration shown in FIG. 22. Generally, obstacles that are taller than the radius of a wheel of a conventional vehicle will block progress of the vehicle beyond the obstacle. However, as shown in FIGS. 23A-23B, the vehicle 200 may traverse beyond such larger obstacles. Each of the wheel assemblies 202 are capable of traversing an obstacle 2302 having a height Y that is no greater than about a length L of the suspension arm 212 plus a radius R of the wheel 216. Thus, for example, if the suspension arm 212 is one meter in length and the wheel 216 has a radius of 0.4 meters, the wheel assembly 202 can negotiate the obstacle 2302 having a height of about 1.4 meters. Comparatively, a conventional vehicle having a wheel with a radius of 0.4 meters could negotiate an obstacle having a height of about 0.4 meters.

Referring now to FIGS. 24A-24F, the obstacle negotiating capabilities of each of the wheel assemblies 202 can be combined to climb obstacles taller than the length of the link 212 plus the radius R of the wheel 216. In an example shown in FIG. 24A, the chassis 204 is pitched upward such that the wheel 216c, 216f are off the surface 218. In this configuration, the weight of the vehicle 200 and any cargo, personnel, or the like is supported by the wheel assemblies 202a, 202b, 202d, 202e.

Figure 24A:
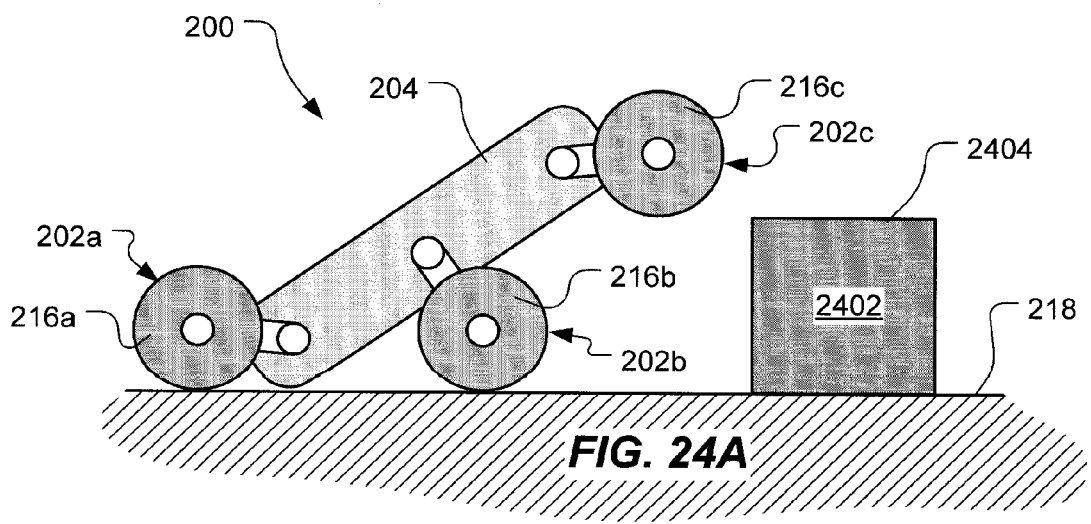
FIGS. 24A-24H are stylized, side, elevational views of the vehicle of FIGS. 2A-2C negotiating an obstacle.
Figure 24B:
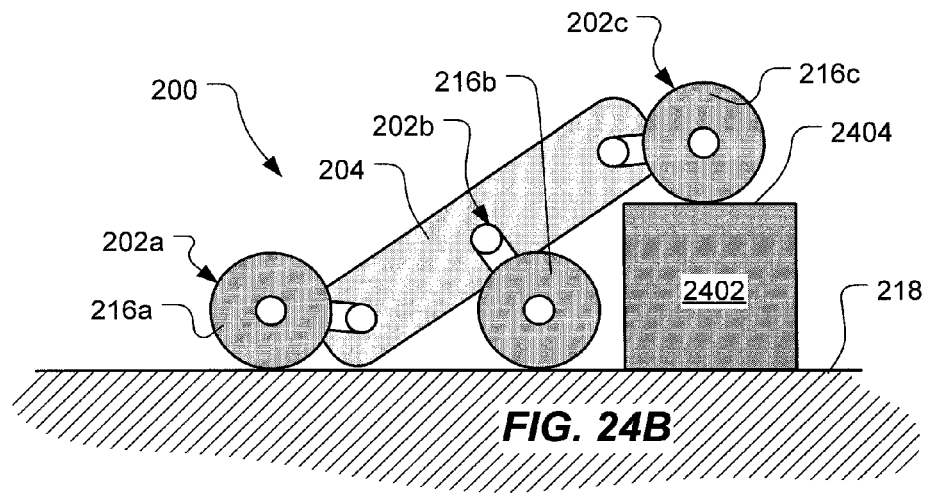

Referring now to FIG. 24B, the wheels 216a, 216b, 216d, 216e are rotated to move the vehicle 200 closer to an obstacle 2402. The wheel assemblies 202c, 202f are rotated with respect to the chassis 204 such that the wheels 216c, 216f are in contact with an upper surface 2404 of the obstacle 2402. Each of the wheels 216a-216f is then rotated to bring the chassis 204 close to the obstacle 2402.

Figure 24C:
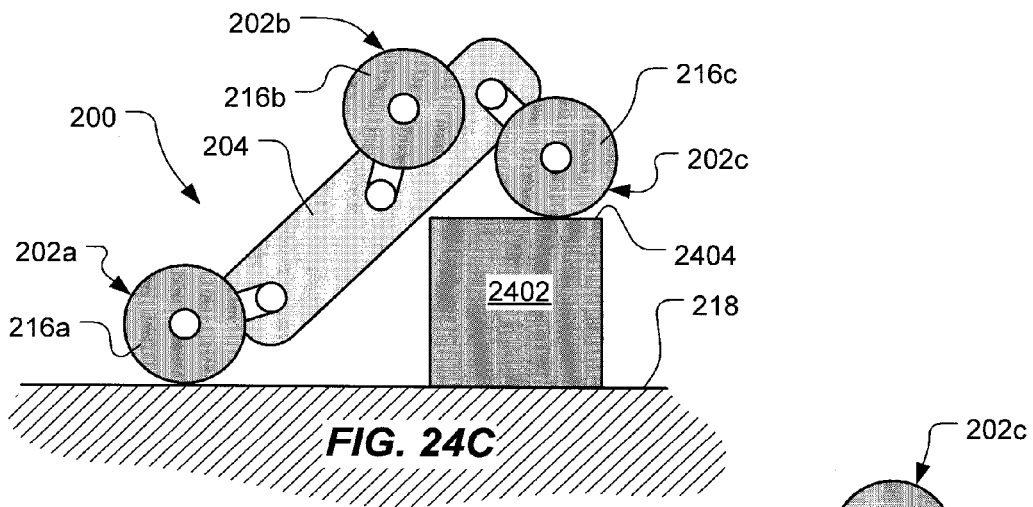
Figure 24D:
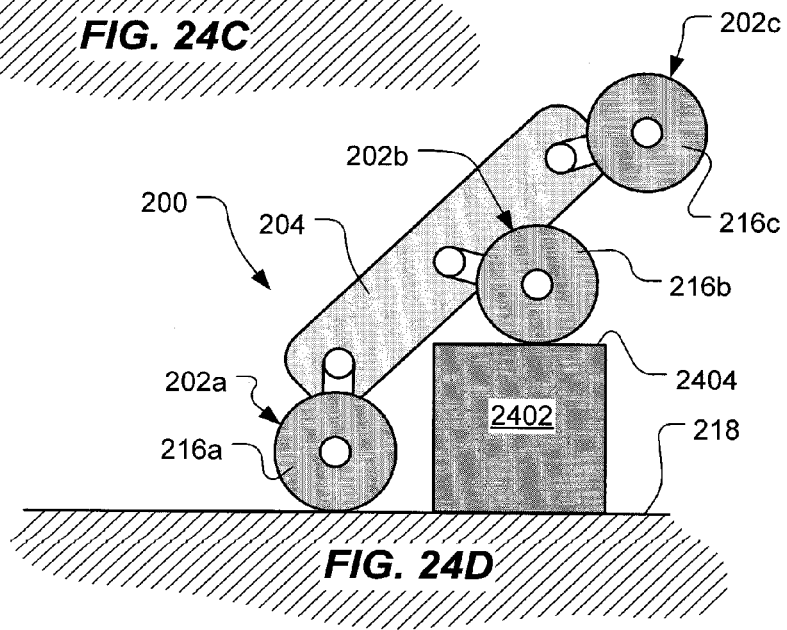
Figure 24E:
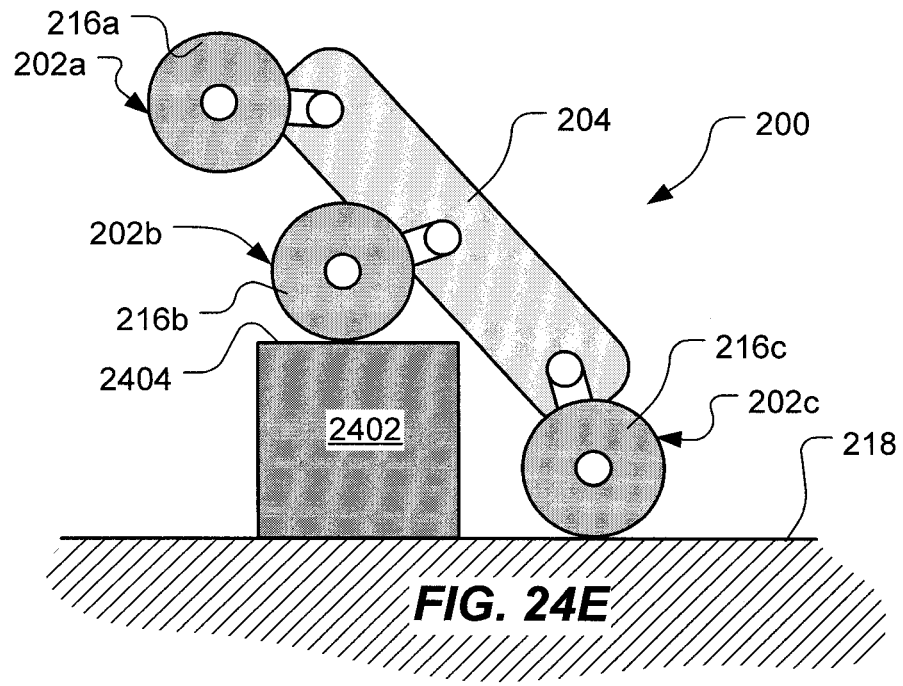
Figure 24F:
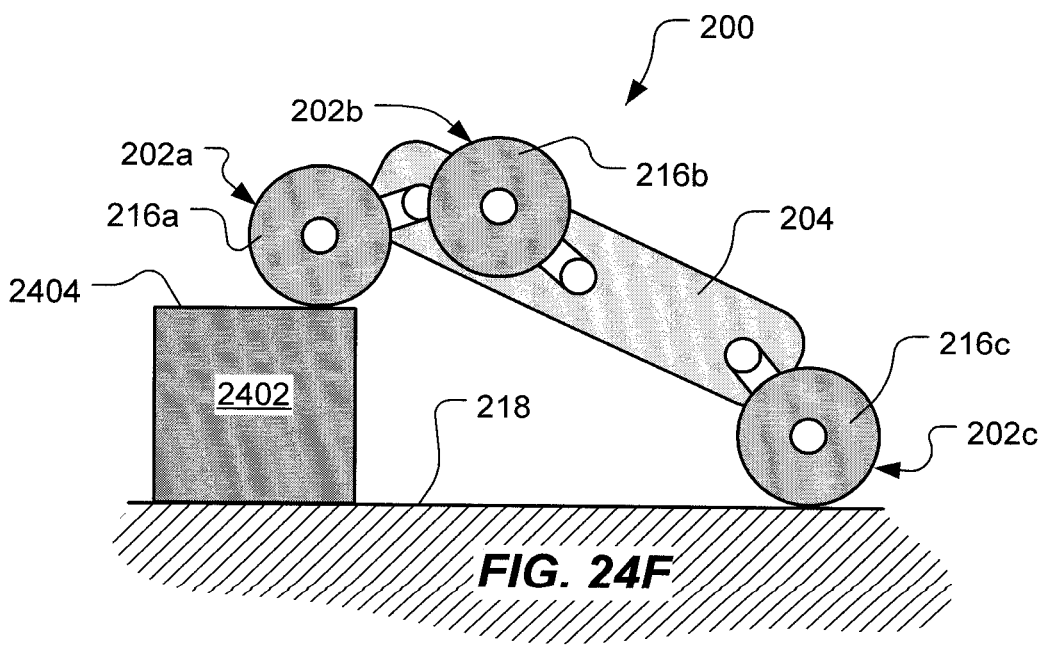
Figure 24G:
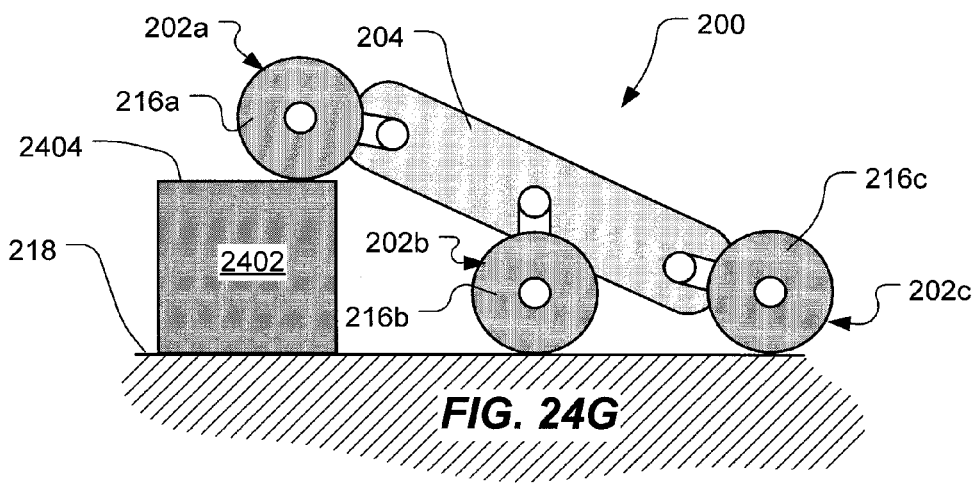
Figure 24H:
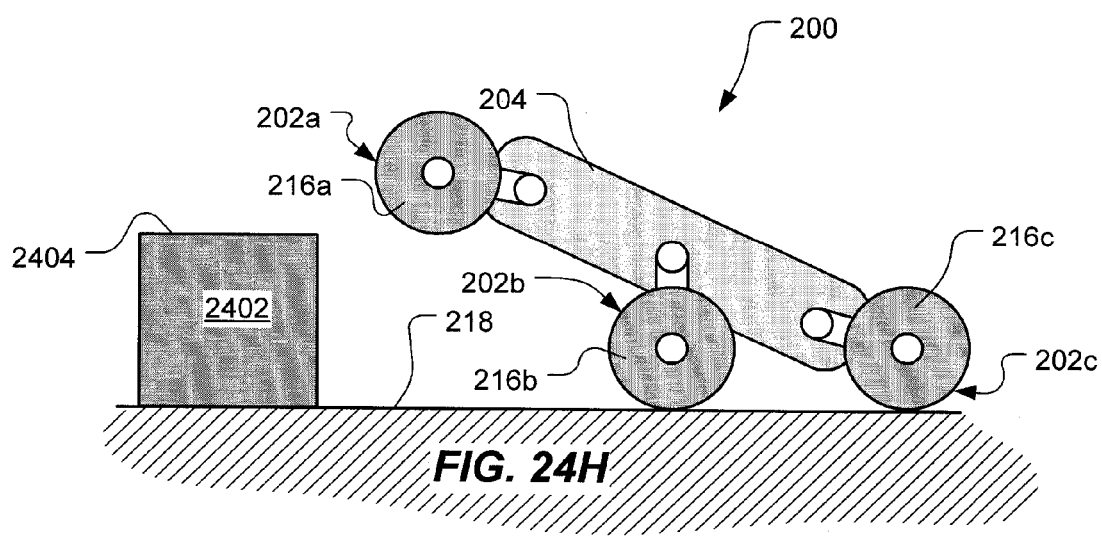

As shown in FIG. 24C, the wheels 216c, 216e are in contact with the top 2404 of the obstacle 2402 and the wheel assemblies 202a, 202b, 202d, 202e are rotated to lift the chassis 204 further from the surface 218 and to bring the chassis closer to the obstacle 2402. The wheel assemblies 202b, 202e are then rotated to shift the center of gravity of the vehicle 200 across the obstacle 2402, thus moving the vehicle 200 over the obstacle 2402, as shown in FIG. 24E, such that the wheels 216c, 216f are in contact with the surface 218. Once the wheels 216c, 216f are in contact with the surface 218, the climbing process of FIGS. 24A-24D can be reversed, as illustrated in FIGS. 24F-24H, respectively, to complete the traversal of the vehicle over the obstacle 2402.

Figure 25:
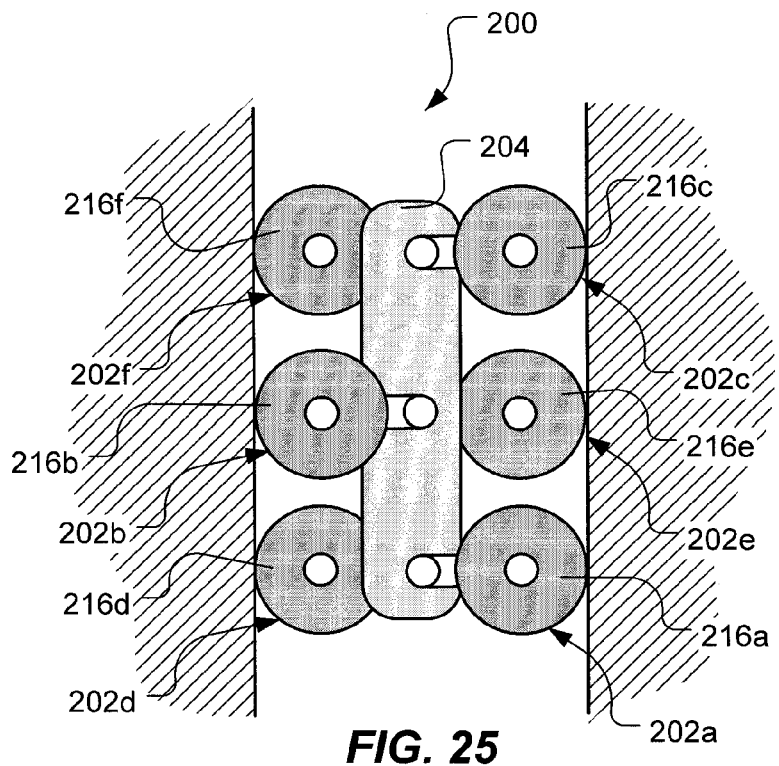
FIG. 25 is a stylized, side, elevational view of the vehicle of FIGS. 2A-2C traversing a generally vertical crevice.

As illustrated in FIG. 25, the vehicle 200 may be configured to travel generally in a vertical direction through a crevice 2501 defined by generally vertically-oriented surfaces 2502, 2504. In the illustrated configuration, the wheel assemblies 202b, 202d, 202f are rotated such that the wheels 216b, 216d, 216f contact the surface 2502. The wheel assemblies 202a, 202c, 202e are rotated such that the wheels 216a, 216c, 216e contact the surface 2504. By rotating some or all of the wheels 216a-216f, the vehicle 200 may traverse generally vertically across the surfaces 2502, 2504. While the surfaces 2502, 2504 are shown as being generally vertical, it will be appreciated that the vehicle 200 may be configured to traverse similar surfaces that are less than vertical. Further, while the vehicle 200 is shown and described above as having a particular configuration to traverse the surfaces 2502, 2504, the vehicle 200 may take on various other configurations that allow it to traverse the surfaces 2502, 2504.

Figure 26:
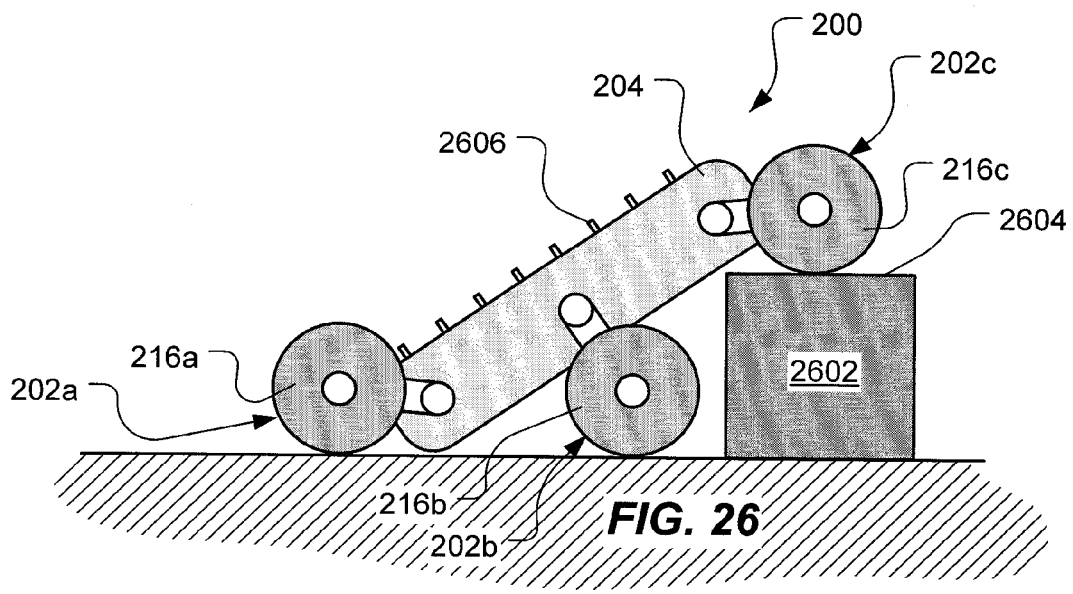
FIG. 26 is a stylized, side, elevational view of the vehicle of FIGS. 2A-2C configured to aid personnel in traversing an obstacle.

FIG. 26 illustrates the vehicle 200 configured to assist personnel in climbing onto and/or over an obstacle 2602. In the illustrated configuration, the wheel assemblies 202a, 202b, 202d, 202e are rotated with respect to the chassis 204 such that the wheels 216a, 216b, 216d, 216e support the vehicle 200 against the surface 218 and such that the chassis 204 is pitched upwardly proximate the obstacle 2602. The wheel assemblies 202c, 202f are rotated with respect to the chassis 204 such that the wheels 216c, 216f contact an upper surface 2604 of the obstacle 2602. In the illustrated embodiment, the chassis 204 further includes a plurality of treads 2606 (only one labeled for clarity) that may aid personnel in climbing the chassis 204 to reach the obstacle 2602. The vehicle 200, however, may omit the treads 2606 and still be used to aid in personnel mobility.

Figure 27:
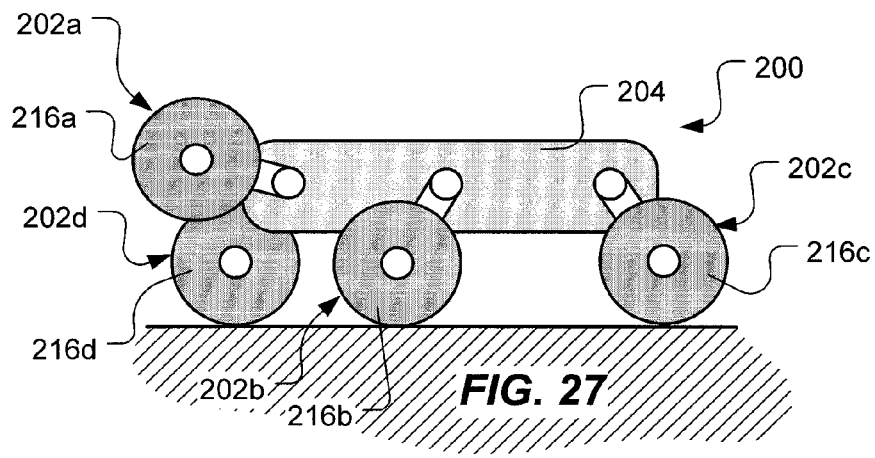
FIG. 27 is a stylized, side, elevational view of the vehicle of FIGS. 2A-2C illustrating a failed wheel assembly rotated away from the surface on which the vehicle is traveling.

The vehicle 200 may, during normal use, sustain a failure of one or more components of the wheel assemblies 202a-202f. For example, as shown in FIG. 27, the hub drives 214

(shown first in FIG. 2B) of the wheel assembly 202a may fail, preventing the wheel 216a coupled therewith from rotating appropriately or a tire 510 (shown in FIG. 5) of the wheel 216a, if so equipped, may be damaged. Thus, as shown in FIG. 27, the failed wheel assembly 202a is rotated with respect to the chassis 204 so that it is not in contact with the surface 218. The vehicle 200, as configured in FIG. 27, is capable of traveling across the surface 218 with as few as three of the wheels 216a-216f in contact with the surface 218. In other words, the vehicle is capable of traveling across the surface 218 with two of the wheels 216a-216c and one of the wheels 216d-216f, or two of the wheels 216d-216f and one of the wheels 216a-216c, in contact with the surface 218. Configuring some of the wheel assemblies 202a-202f such that their wheels 216a-216f are raised from the surface 218 may also be advantageous in avoiding detection by sensors, such as centroidal trackers, of opposing forces.

Figure 28:
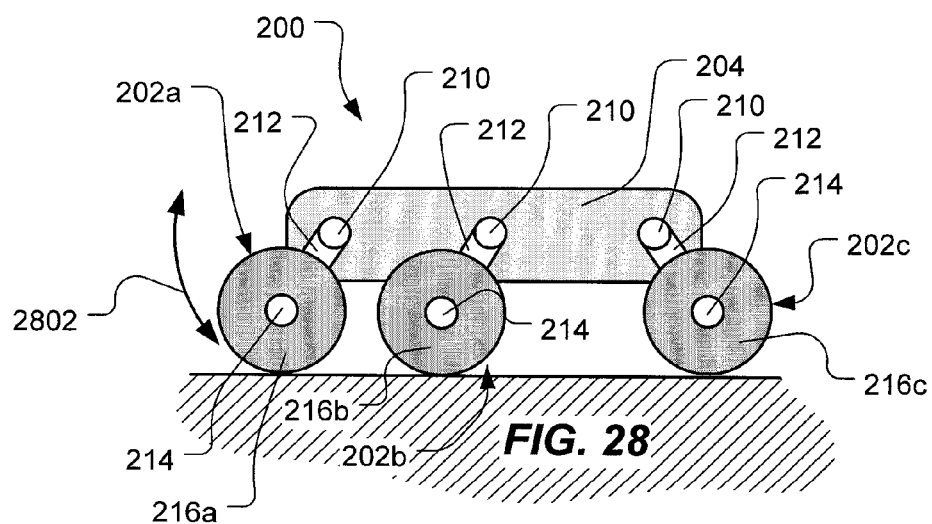
FIG. 28 is a stylized, side, elevational view of the vehicle of FIGS. 2A-2C illustrating a failed wheel assembly "floating" over the surface on which the vehicle is traveling.

Alternatively, as shown in FIG. 28, it may be advantageous to allow damaged wheel assembly 202a to "float" across the surface 218. In this configuration, neither the shoulder joint 210 nor the hub drive 214 are driven, thus allowing the suspension arm 212 of the wheel assembly 202a to rotate freely with respect to the chassis 204 (as indicated by an arrow 2802) and allowing the wheel 216a to rotate freely with respect to the suspension arm 212 of the wheel assembly 202, such that it rolls across the surface 218 under its own weight as the vehicle 200 travels thereacross. In embodiments of the vehicle that include the rotary MR damper 502, first shown in FIG. 5 but best shown in FIG. 6A-FIG. 6C, power may be removed therefrom to reduce the stiffness of the damper 502, such that the suspension arm 212 may rotate freely with respect to the chassis. It may be desirable, however, to provide some stiffness in the damper 502 (by at least partially activating the MR fluid 632) to dampen vibrations induced in the wheel assembly 202a due to the interaction of the wheel 216a with the surface 218 as the vehicle 200 traverses thereacross.

Figure 29:
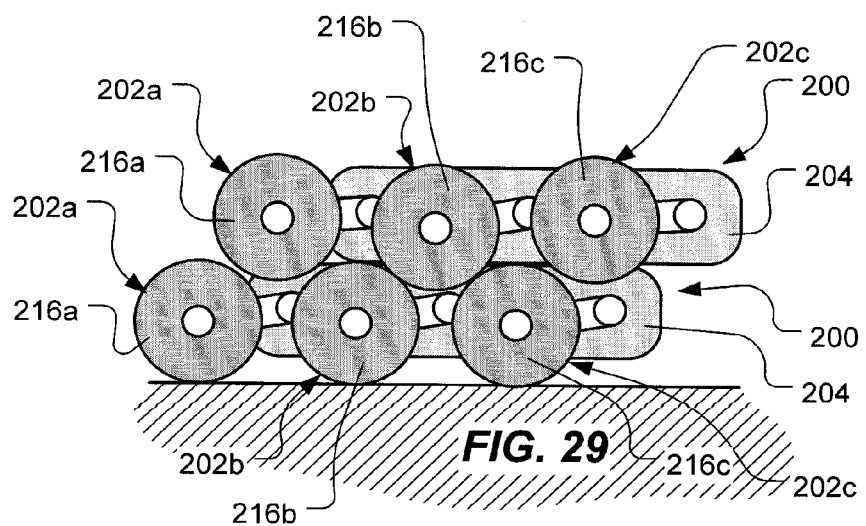
FIG. 29 is a stylized, side, elevational view of two of the vehicles of FIGS. 2A-2C in a stacked configuration.

It may be desirable to deploy the vehicle 200 from an aircraft. Thus, as illustrated in FIG. 29, the wheel assemblies 202 may be rotated such that they are retracted adjacent the sides 206, 208 (208 not shown in FIG. 29 but shown in FIG. 2B). As a result, the vehicle 200 takes up a small amount of space and multiple vehicles 200 may be stacked in a nested fashion, one on another, which is advantageous when transporting such vehicles by aircraft.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method for maneuvering a wheeled vehicle having an articulated suspension system, the method comprising:
   articulating the suspension system such that a first wheel contacts a first surface;
   articulating the suspension system such that a second wheel and a third wheel contact a second surface, the second surface opposing the first surface; and
   driving the vehicle through the space defined by the opposing first and second surfaces.

2. The method of claim 1, further comprising articulating the suspension system to compensate for variations in the first and second surfaces as the vehicle is driven through the space.

3. A method for controlling a wheeled vehicle having an articulated suspension system, comprising articulating the suspension system to inhibit rollover of the vehicle.

4. A method for maneuvering a wheeled vehicle having an articulated suspension system, the method comprising articulating the wheels above the belly plane of vehicle's chassis such that the chassis contacts the surface to brake the vehicle.

5. A vehicle, comprising:
   a chassis; and
   a plurality of wheel assemblies articulated with the chassis, each of the plurality of wheel assemblies including:
      a rotatable wheel spaced away from the chassis and independently rotatable above the plane of the vehicle;
      a shoulder joint rotatably joining the wheel assembly to the chassis,
   wherein at least two of the shoulder joints define an axis through the chassis that is not aligned with the center of gravity for the vehicle and wherein at least one of the plurality of wheel assemblies is capable of being articulated with the chassis through at least one revolution.

6. A vehicle, comprising:
   a chassis; and
   a plurality of wheel assemblies articulated with the chassis, each of the plurality of wheel assemblies including:
      a rotatable wheel spaced away from the chassis and independently rotatable above the plane of the vehicle;
      a shoulder joint rotatably joining the wheel assembly to the chassis,
   wherein at least two of the shoulder joints define an axis through the chassis that is not aligned with the center of gravity for the vehicle and wherein the vehicle is capable of lifting at least one of the wheel assemblies off a surface by articulating at least some of the other wheel assemblies.

7. A vehicle, comprising:
   a chassis; and
   an articulated suspension system mounted to the chassis, the articulated suspension system including a plurality of elements that may be independently articulated, the articulated suspension system including:
      a plurality of suspension arms;
      a plurality of driven shoulder joints rotatably joining the chassis and the plurality of suspension arms, wherein at least two of the shoulder joints define an axis through the chassis that is not aligned with the center of gravity for the vehicle;
      a plurality of wheels rotatable above the plane of the vehicle by the shoulder joints; and
      a plurality of hub drives rotatably joining the plurality of wheels and the plurality of suspension arms,
   wherein at least one of the plurality of elements is capable of being rotated with respect to the chassis through at least one revolution.

8. A method of operating a vehicle, comprising:
   articulating at least one of a plurality of wheel assemblies with a chassis, each of the wheel assemblies including a wheel spaced apart from the chassis and independently rotatable above the plane of the vehicle by a shoulder joint, wherein at least two of the shoulder joints define an axis through the chassis that is not aligned with the center of gravity for the vehicle; and
   driving at least some of a plurality of hub drives.

9. A method of operating a vehicle, comprising:

articulating at least one of a plurality of wheel assemblies with a chassis, each of the wheel assemblies including a wheel spaced apart from the chassis and independently rotatable above the plane of the vehicle by a shoulder joint, wherein at least two of the shoulder joints define an axis through the chassis that is not aligned with the center of gravity for the vehicle; and changing a speed of at least some of the wheels of a first group of the plurality of wheel assemblies relative to a speed of the wheels of at least some of a second group of the plurality of wheel assemblies.

10. A method of operating a vehicle, comprising:

articulating at least one of a plurality of wheel assemblies with a chassis through at least one revolution, each of the wheel assemblies including a wheel spaced apart from the chassis and independently rotatable above the plane of the vehicle by a shoulder joint, wherein at least two of the shoulder joints define an axis through the chassis that is not aligned with the center of gravity for the vehicle.

11. A method of operating a vehicle, comprising:

articulating at least one of a plurality of wheel assemblies with a chassis, each of the wheel assemblies including a wheel spaced apart from the chassis and independently rotatable above the plane of the vehicle by a shoulder joint, wherein at least two of the shoulder joints define an axis through the chassis that is not aligned with the center of gravity for the vehicle; and articulating a first group of the plurality of wheel assemblies to lift a second group of the plurality of wheel assemblies from a surface.

12. A method of operating a vehicle, comprising:

articulating at least one of a plurality of wheel assemblies with a chassis, each of the wheel assemblies including a wheel spaced apart from the chassis and independently rotatable above the plane of the vehicle by a shoulder joint, wherein at least two of the shoulder joints define an axis through the chassis that is not aligned with the center of gravity for the vehicle; and rotating a failed wheel assembly of the plurality of wheel assemblies such that the wheel thereof is spaced away from a surface.

* * * * *